(12) United States Patent
Wicken et al.

(10) Patent No.: US 10,124,268 B1
(45) Date of Patent: Nov. 13, 2018

(54) SELF-ADJUSTING SUPPORT PLATE

(71) Applicant: Balloon Innovations LLC, Westminster, CO (US)

(72) Inventors: Christopher J. Wicken, Littleton, CO (US); Gregg A. Wicken, Littleton, CO (US)

(73) Assignee: BALLOON INNOVATIONS INC., Westminster, CO (US)

( * ) Notice: Subject to any disclaimer, the term of this patent is extended or adjusted under 35 U.S.C. 154(b) by 194 days.

(21) Appl. No.: 14/742,855

(22) Filed: Jun. 18, 2015

Related U.S. Application Data

(60) Provisional application No. 62/013,973, filed on Jun. 18, 2014.

(51) Int. Cl.
| | | |
|---|---|---|
| A63H 27/10 | (2006.01) | |
| F16B 9/02 | (2006.01) | |
| F16M 11/08 | (2006.01) | |
| A47F 10/00 | (2006.01) | |

(52) U.S. Cl.
CPC ............ *A63H 27/10* (2013.01); *A47F 10/00* (2013.01); *F16B 9/02* (2013.01); *F16M 11/08* (2013.01); *A63H 2027/1008* (2013.01)

(58) Field of Classification Search
CPC ....... E02D 5/80; E04H 12/22; E04H 12/2207; E04H 12/2215; E04H 12/223; E04H 12/2252; E04H 12/2269; E04H 12/2284; F16B 9/00; F16B 9/02; F16B 9/023; F16B 9/026; F16M 11/06; F16M 11/08; F16M 11/12; F16M 11/125; F16M 11/126; F16M 11/128; F16M 11/14
USPC ...... 211/13.1, 133.4, 196, 205; 248/87, 156, 248/163.3, 177.1, 181.1, 181.2, 432, 440, 248/440.1, 519, 520, 521, 522, 523, 530, 248/532, 545; 33/295; 403/90, 96; 47/41.14, 41.13, 41.15, 42, 44; 52/126.1, 52/155, 162, 165
See application file for complete search history.

(56) References Cited

U.S. PATENT DOCUMENTS

| | | |
|---|---|---|
| 262,517 A | 8/1882 | Hendrie |
| 1,527,046 A | 10/1922 | Ingram |
| 1,512,831 A | 10/1924 | Dunnell |

(Continued)

FOREIGN PATENT DOCUMENTS

| | | | | |
|---|---|---|---|---|
| WO | WO 2010000403 A2 * | 1/2010 | ......... | E04H 12/2215 |
| WO | 2015195981 A1 | 12/2015 | | |

OTHER PUBLICATIONS

U.S. Appl. No. 14/742,855, filed Jun. 18, 2015, First Inventor: Christopher J. Wicken.

(Continued)

*Primary Examiner* — Joshua E Rodden
(74) *Attorney, Agent, or Firm* — Berg Hill Greenleaf Ruscitti, LLP.

(57) ABSTRACT

The inventive technology includes a support plate that may be secured to an attachment surface and be coupled with a display, such as a balloon support. A vertical pole coupled with a rotational head may be positioned with a rotational head chamber of the support plate such that it is able to rotate. This self-adjusting feature allows a support plate to be secured to an angled or uneven attachment surface such as the side of a hill or other incline, while allowing a vertical pole to be rotationally self-adjusted to an approximately vertical position.

12 Claims, 38 Drawing Sheets

(56) References Cited

U.S. PATENT DOCUMENTS

| | | | |
|---|---|---|---|
| 1,535,396 A | 4/1925 | Buehler | |
| 1,648,338 A | 11/1927 | Gains | |
| 1,677,379 A | 7/1928 | Ames | |
| 1,782,070 A | 11/1930 | Lazarus | |
| 1,788,157 A | 1/1931 | Hogan | |
| 2,143,691 A | 4/1938 | Goldberg et al. | |
| 2,209,875 A | 7/1940 | Eichelsdoerfer | |
| 2,488,396 A | 11/1949 | Gottholm | |
| 2,664,667 A | 1/1954 | Burroughs | |
| 2,840,948 A | 7/1958 | Stickley | |
| 2,922,252 A | 1/1960 | Dam | |
| 2,924,041 A | 2/1960 | Jackson | |
| 3,150,460 A | 9/1964 | Dees | |
| 3,162,409 A | 12/1964 | Straayer | |
| 3,366,999 A | 2/1968 | Darby | |
| 3,381,649 A * | 5/1968 | Ward | B63H 25/52 |
| | | | 114/169 |
| 3,439,079 A | 4/1969 | McDowell | |
| 3,892,081 A | 7/1975 | Goral | |
| 3,920,207 A | 11/1975 | Adamaitis | |
| 4,035,462 A | 7/1977 | Lane, Jr. | |
| 4,135,716 A * | 1/1979 | Ginsburg | A63B 61/02 |
| | | | 473/416 |
| 4,589,854 A | 5/1986 | Smith | |
| 4,712,510 A | 12/1987 | Tae-Ho | |
| 4,794,498 A | 12/1988 | Neumeier | |
| 4,803,784 A * | 2/1989 | Miller | G01C 15/06 |
| | | | 33/293 |
| 4,895,545 A | 1/1990 | Nelson | |
| 4,926,785 A * | 5/1990 | Lamson | E04H 12/2215 |
| | | | 116/209 |
| 1,953,719 A | 9/1990 | Yaffe | |
| 4,953,713 A | 9/1990 | Yaffe | |
| 5,027,992 A | 7/1991 | Murray | |
| 5,036,985 A * | 8/1991 | Lovik | A47F 7/00 |
| | | | 211/13.1 |
| 5,052,733 A | 10/1991 | Cheung et al. | |
| 5,127,867 A | 7/1992 | Lau | |
| 5,188,332 A | 2/1993 | Callas | |
| 5,203,530 A | 4/1993 | Liu | |
| 5,234,726 A | 8/1993 | Dahan | |
| 5,282,768 A | 2/1994 | Akman | |
| 5,301,462 A * | 4/1994 | Hronyetz | A47G 33/1226 |
| | | | 248/521 |
| 5,564,575 A | 10/1996 | Casement | |
| 5,575,470 A | 11/1996 | Sherman | |
| 5,746,461 A | 5/1998 | Broberg | |
| 5,769,474 A | 6/1998 | Moore | |
| 5,823,365 A | 10/1998 | Page | |
| 5,873,764 A | 2/1999 | Scherr | |
| 5,938,255 A | 8/1999 | Rose et al. | |
| 5,944,576 A | 8/1999 | Nelson et al. | |
| 6,176,558 B1 | 1/2001 | Wu | |
| 6,176,758 B1 | 1/2001 | Wu | |
| 6,273,479 B1 | 8/2001 | Carlson | |
| 6,276,869 B1 * | 8/2001 | Yakushinji | E01F 15/0469 |
| | | | 256/1 |
| 6,298,611 B1 * | 10/2001 | Oliver | E02D 5/801 |
| | | | 248/156 |
| 6,422,914 B1 | 7/2002 | Nelson | |
| 6,478,057 B1 | 11/2002 | Bearss et al. | |
| 6,478,651 B1 | 11/2002 | Weir | |
| 6,745,904 B1 | 6/2004 | Komar | |
| 6,923,141 B1 | 8/2005 | Staats | |
| 6,935,268 B1 | 8/2005 | Hawkins | |
| 6,938,871 B1 | 9/2005 | Carlson | |
| 6,969,295 B1 | 11/2005 | Sidwell | |
| D517,123 S | 3/2006 | Sidwell | |
| 7,017,511 B2 | 3/2006 | Fisher | |
| 7,249,991 B1 | 7/2007 | Watson | |
| 7,588,477 B2 | 9/2009 | Sidwell | |
| 7,611,395 B2 | 11/2009 | Bonsabiante | |
| D610,208 S | 2/2010 | Hou | |
| 7,739,796 B2 * | 6/2010 | Froese | E04H 12/2215 |
| | | | 29/897 |
| 7,810,265 B2 | 10/2010 | Beatty | |
| 7,854,642 B2 | 12/2010 | Nelson | |
| 7,967,344 B2 | 6/2011 | Herren | |
| 8,152,588 B2 | 4/2012 | Hua | |
| D659,200 S | 5/2012 | Wicken | |
| 8,544,407 B2 | 10/2013 | Spray | |
| 8,789,565 B1 | 7/2014 | Wicken | |
| 8,840,440 B2 | 9/2014 | Pierce | |
| 8,968,047 B1 | 3/2015 | Wicken | |
| 8,978,676 B2 * | 3/2015 | Williams | E04H 12/2238 |
| | | | 135/16 |
| 9,087,462 B1 | 7/2015 | Gallus | |
| 9,132,595 B1 | 9/2015 | Wicken et al. | |
| 9,192,870 B2 * | 11/2015 | Chapman-Rickman | |
| | | | A63H 27/10 |
| 9,809,784 B2 | 11/2017 | Wang et al. | |
| 2001/0045074 A1 | 11/2001 | Kim | |
| 2003/0071185 A1 | 4/2003 | Casapulla | |
| 2004/0077268 A1 | 4/2004 | Wainohu | |
| 2006/0011793 A1 * | 1/2006 | Dupuis | H01Q 1/1207 |
| | | | 248/205.5 |
| 2006/0289707 A1 | 12/2006 | Greenwald et al. | |
| 2006/0292960 A1 | 12/2006 | Muller | |
| 2007/0007424 A1 | 1/2007 | Sifferlin et al. | |
| 2007/0049158 A1 | 3/2007 | Chou | |
| 2007/0218802 A1 | 9/2007 | Gronethal | |
| 2008/0121309 A1 | 5/2008 | Boise et al. | |
| 2008/0166942 A1 | 7/2008 | Hou | |
| 2008/0166943 A1 | 7/2008 | Hou | |
| 2009/0197502 A1 | 8/2009 | Nelson et al. | |
| 2011/0240823 A1 | 10/2011 | Hua | |
| 2011/0290171 A1 | 12/2011 | Brick | |
| 2012/0015581 A1 | 1/2012 | Feldstein | |
| 2012/0211614 A1 | 8/2012 | Parello et al. | |
| 2012/0326001 A1 * | 12/2012 | Suutarinen | E01F 9/681 |
| | | | 248/521 |
| 2013/0206954 A1 * | 8/2013 | Wells | E04H 12/2246 |
| | | | 248/523 |
| 2014/0096867 A1 | 4/2014 | Cayton | |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
U.S. Appl. No. 29/4444,898, filed Feb. 5, 2013, First Inventor: Christopher J. Wicken.
International Application No. PCT/US15/036527, filed Jul. 21, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.
U.S. Appl. No. 14/831,759, filed Aug. 20, 2015, First Inventor: Christopher J. Wicken.

(56) References Cited

OTHER PUBLICATIONS

U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.

* cited by examiner

SELF-ADJUSTING SUPPORT PLATE

This application claims the benefit of and priority to U.S. Provisional Application No. 62/013,973 filed Jun. 18, 2014. The entire specification and figures of the above-mentioned application is hereby incorporated in its entirety by reference.

TECHNICAL FIELD

Generally, the inventive technology disclosed herein relates to a novel and unique self-adjusting support plate. The invention may be used to support, for example, one or more helium-free balloons and display systems that are positioned near commercial establishments to attract attention and/or highlight a specific promotion or event. In a preferred embodiment, the inventive technology may include a support plate that may be used to secure a helium-free balloon display system, which may further incorporate flexible and/or static rods coupled to one or more central vertical poles. The inventive technology, described generally herein further relates to a self-adjusting support plate system that may be secured to a sloped or angled surface and may further be coupled with a pole, display or other support such that the coupled support may be maintained in an approximately vertical position.

BACKGROUND OF THE INVENTION

Traditional marketing displays are often placed in and around business or other locations to attract customer attention. Certain traditional displays may include, for example a marketing or promotional display positioned outside a business establishment advertising a sale or other promotion. Other traditional systems may merely include simple consumer attractants, such as balloon displays and the like. In a typical traditional system such a display may be attached to a vertical pole or other attachment device such that it may be inserted into the ground. However, such traditional systems are limited in certain aspects. First, such traditional systems are largely incompatible with angled or sloped surfaces. For example, in some instances it may be difficult to position and maintain a traditional display in an up-right position on an included surface. In some instances, for example environmental factors, such as wind, or even the displays own weight may cause it to fall out of a desired vertical position. In some instances such factors may cause the display to become unsupportable and simply fall over. Naturally, such problems are directly contrary to the purposes of such displays which are to provide clear lines of sight for potential consumers.

Second, such traditional systems may damage the underlying attachment surface. For example, for large displays, any vertical pole, or other support may need to be significantly robust so as to support the weight of the display. Such a robust support may include a large pole or support which may need to be driven into the ground forming a large hole. Again, environmental factors such as wind, consumers interacting with the display, as well as the display's own weights may cause movement of the vertical pole or support to move, enlarging the hole or causing it to be inserted deeper than what was intended, further damaging the attachment surface and lessening the commercial impact of the display. Third, traditional single-pole displays may not be suitable for loose soil or even hard non-penetrable attachment surfaces. Fourth, the inventive technologies self-adjusting rotational head may allow for less wear on the support plate as compared to other traditional display plates.

The current invention overcomes these limitations of, and indeed surpasses the functionality of such traditional display support systems. It is therefore the object of the present invention to provide a simple, versatile, cost effective self-adjusting support plate system that may be compatible with a variety of attachment surfaces. Accordingly, the objects of the methods and apparatus described herein address each of the aforementioned problems and goals in a practical manner. Naturally, further objects of the inventive technology will become apparent from the description and drawings below.

SUMMARY OF INVENTION

It is the object of the present invention to provide a self-adjusting support plate to address the comprehensive concerns outlined above. Additional objects of the current invention may also be to provide: a self-adjusting support plate having at least one surface fastener that can be configured to be coupled with a surface fastener slot so as to secure the support plate to an attachment surface, such as an inclined ground position. This support plate may further one or more support plate apertures through which a vertical pole, display or balloon support may be inserted. In a preferred embodiment this support plate aperture may form a rotational head chamber that may be permanently or transiently coupled with a rotational head which may be configured to be secured to a vertical pole, again that may be inserted through said support plate aperture. In this preferred embodiment this rotational may be rotationally adjustable such that the support plate may be secured to an inclined surface while one or more vertical pole or like supports may be maintained in a substantially vertical position.

DETAILED DESCRIPTION OF THE INVENTION

Figure 1:
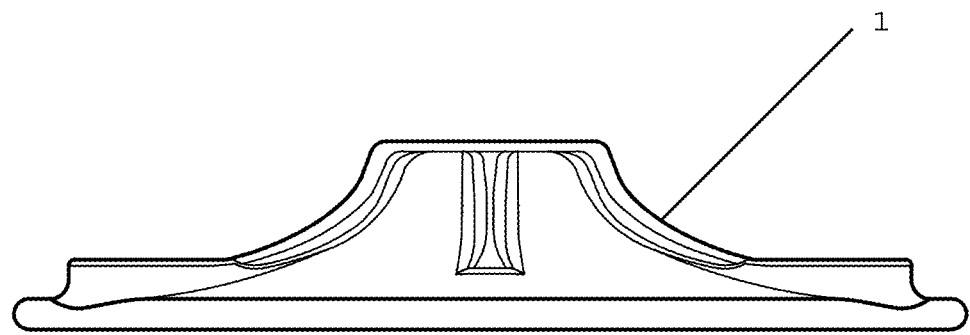
FIG. 1: is a front view of a support plate in one embodiment thereof.
Figure 2:
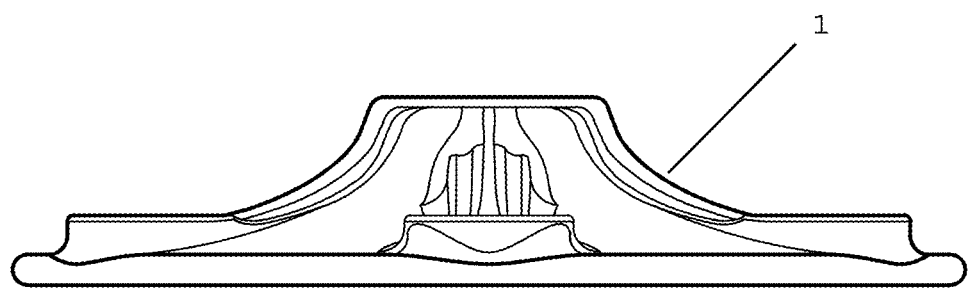
FIG. 2: is a back view of a support plate in one embodiment thereof.
Figure 3:
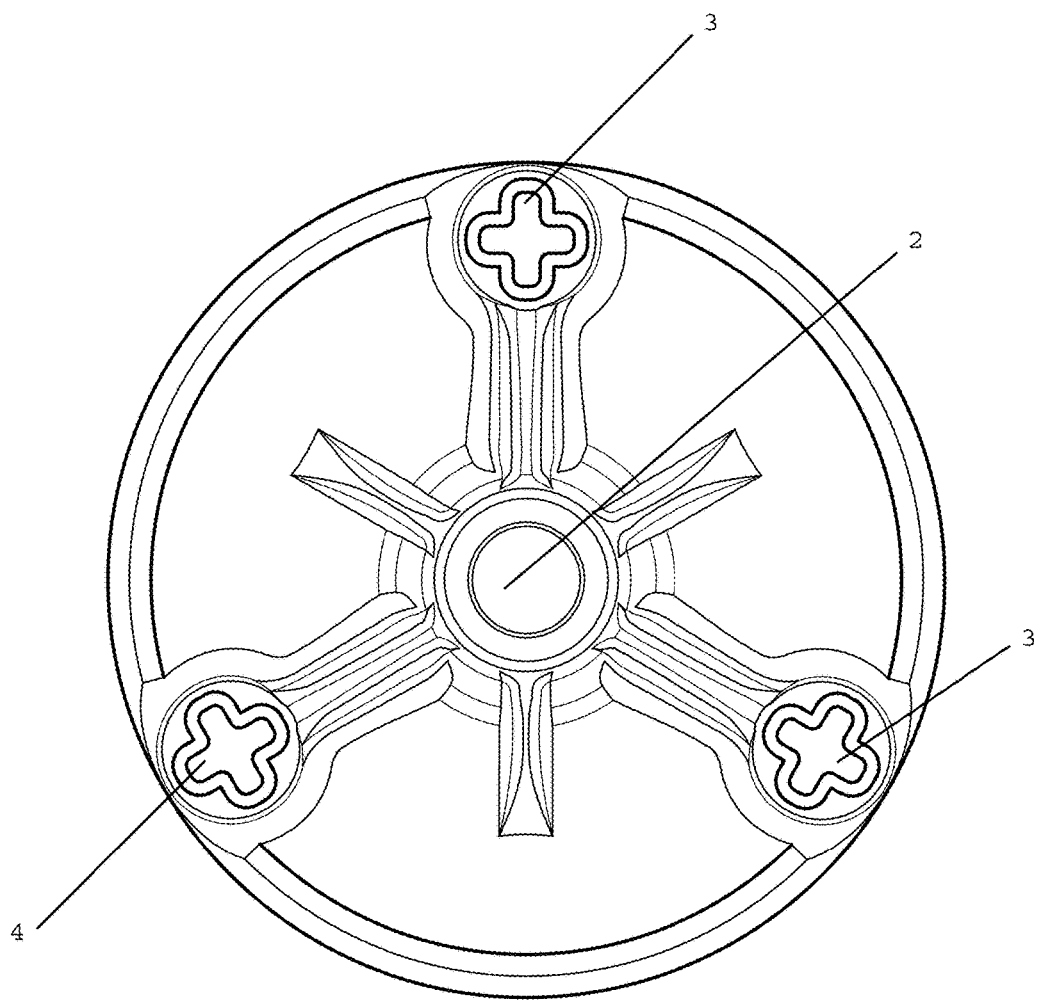
FIG. 3: is a top view of a support plate in one embodiment thereof.
Figure 4:
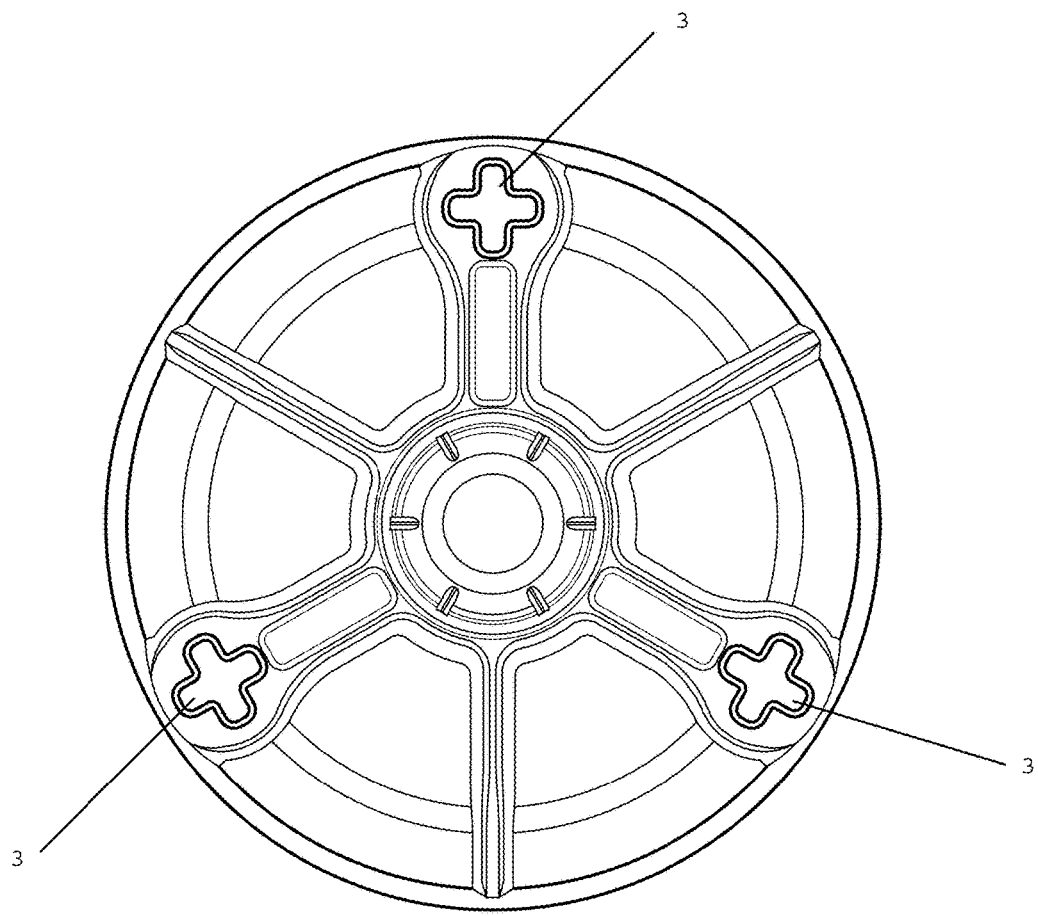
FIG. 4: is a bottom view of a support plate in one embodiment thereof.
Figure 5:
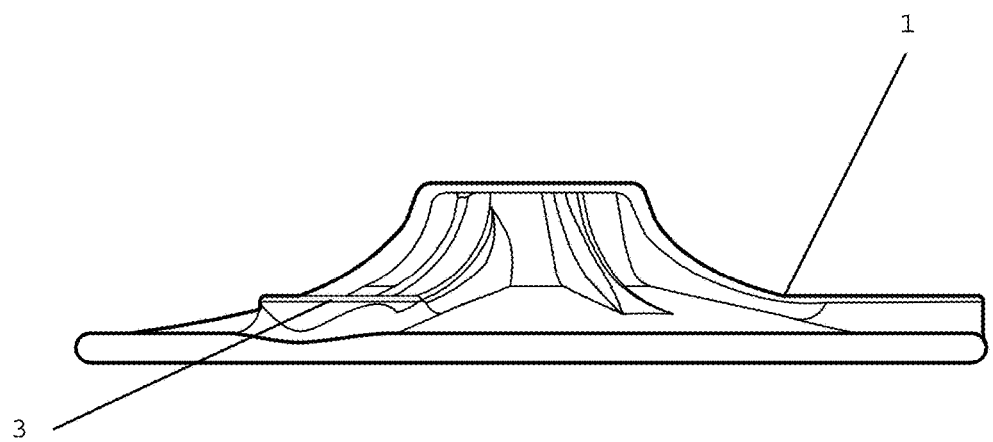
FIG. 5: is a side view of a support plate in one embodiment thereof.
Figure 6:
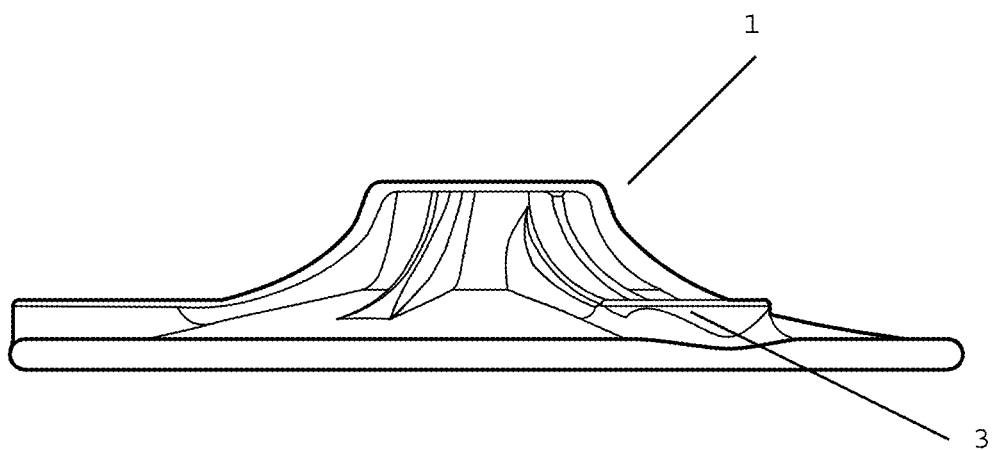
FIG. 6: is a side view of a support plate in one embodiment thereof.
Figure 7:
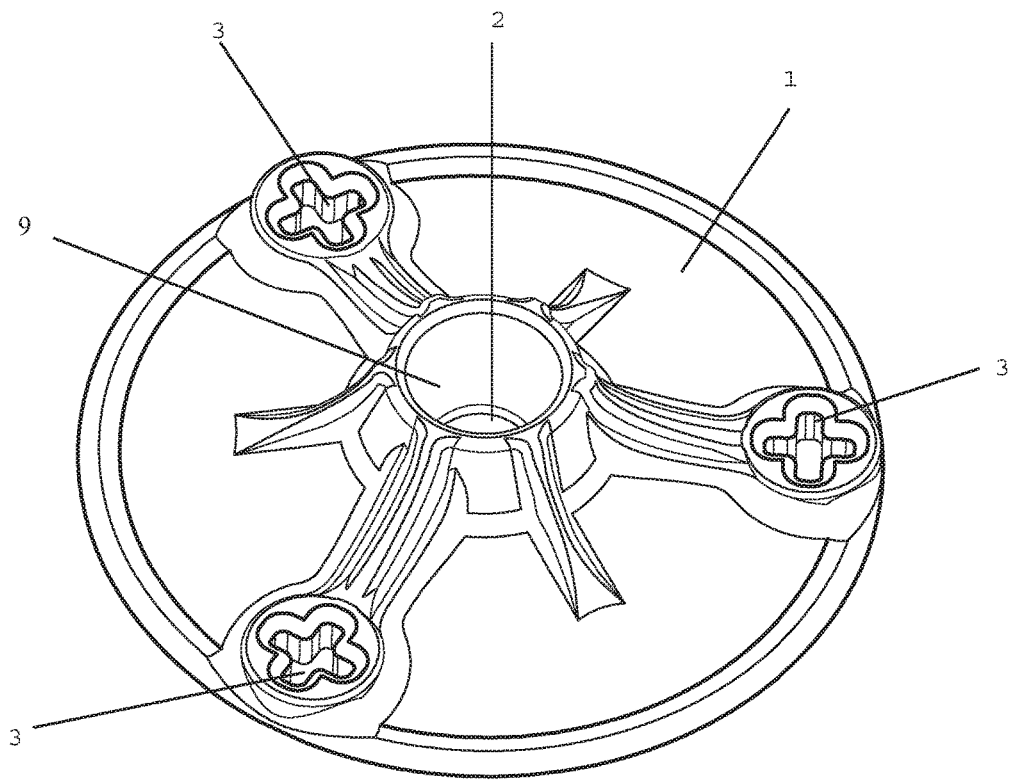
FIG. 7: is a perspective view of a support plate in one embodiment thereof.
Figure 8:
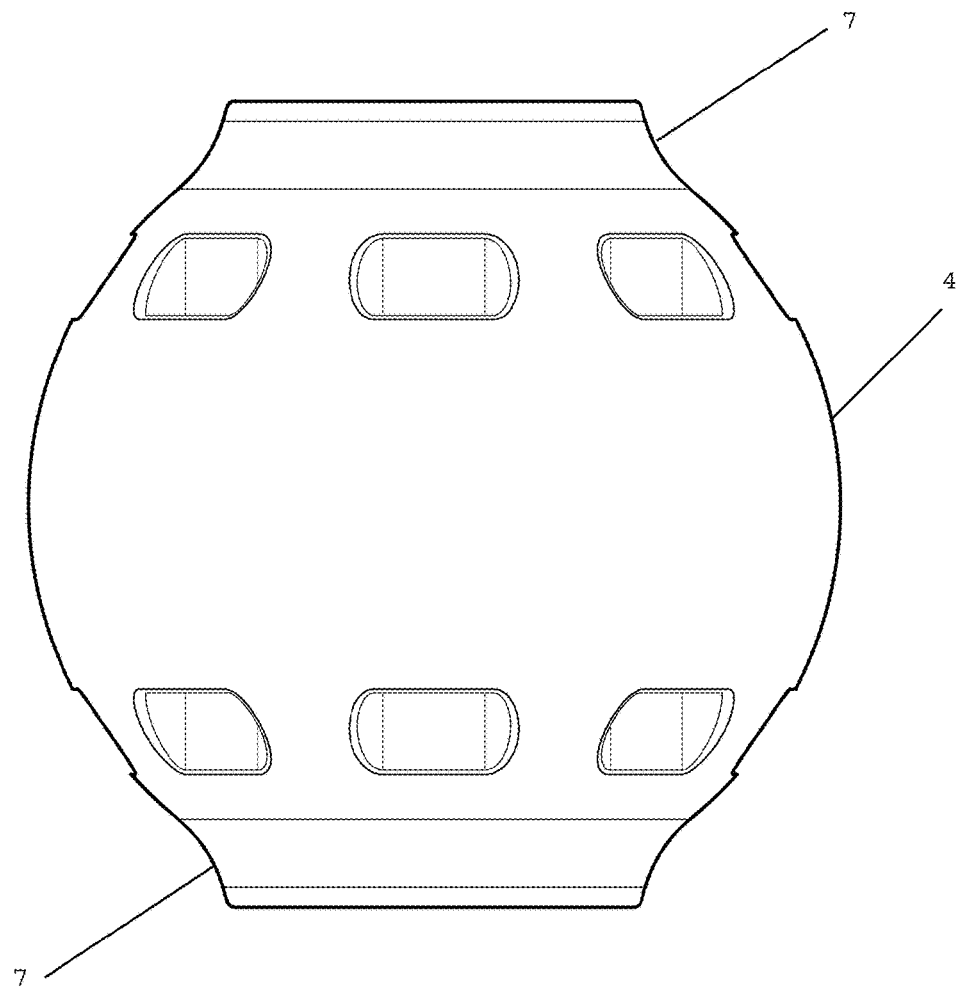
FIG. 8: is a front view of a rotational head in one embodiment thereof.
Figure 9:
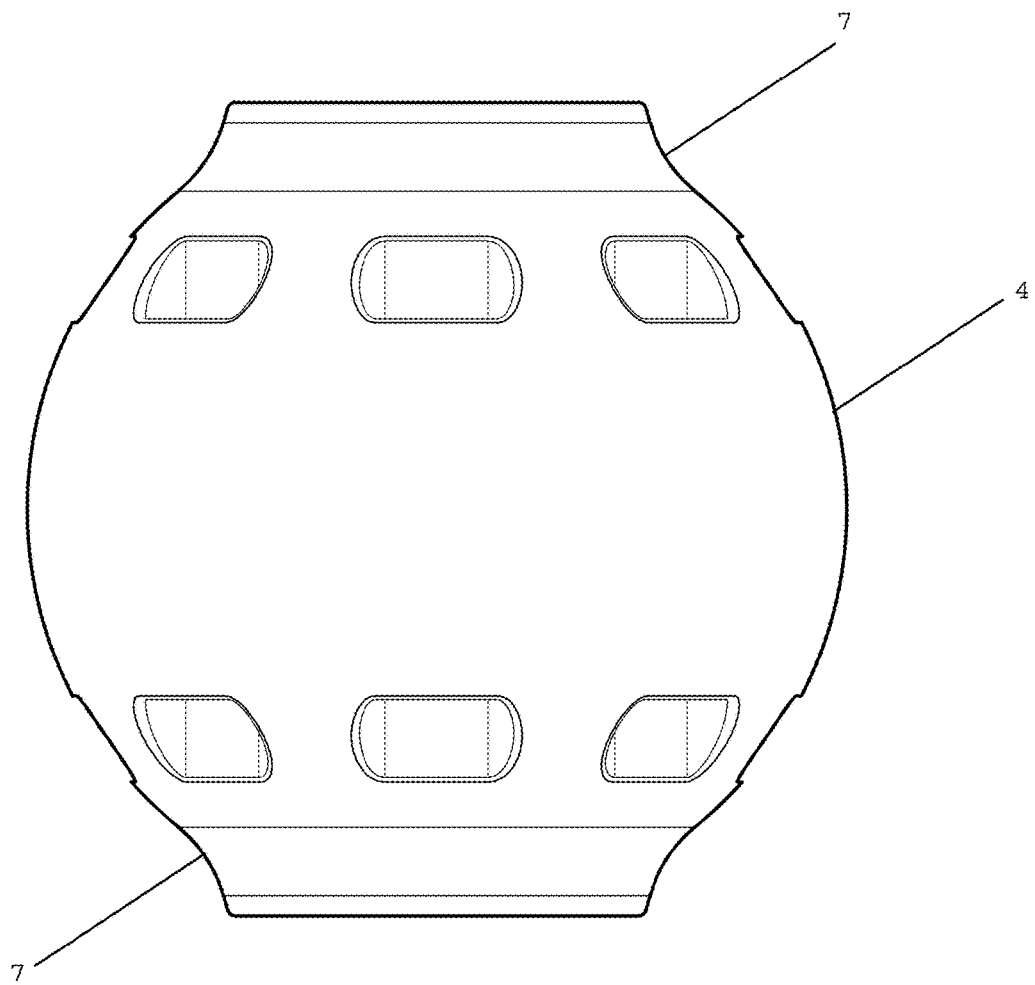
FIG. 9: is a back view of a rotational head in one embodiment thereof.
Figure 10:
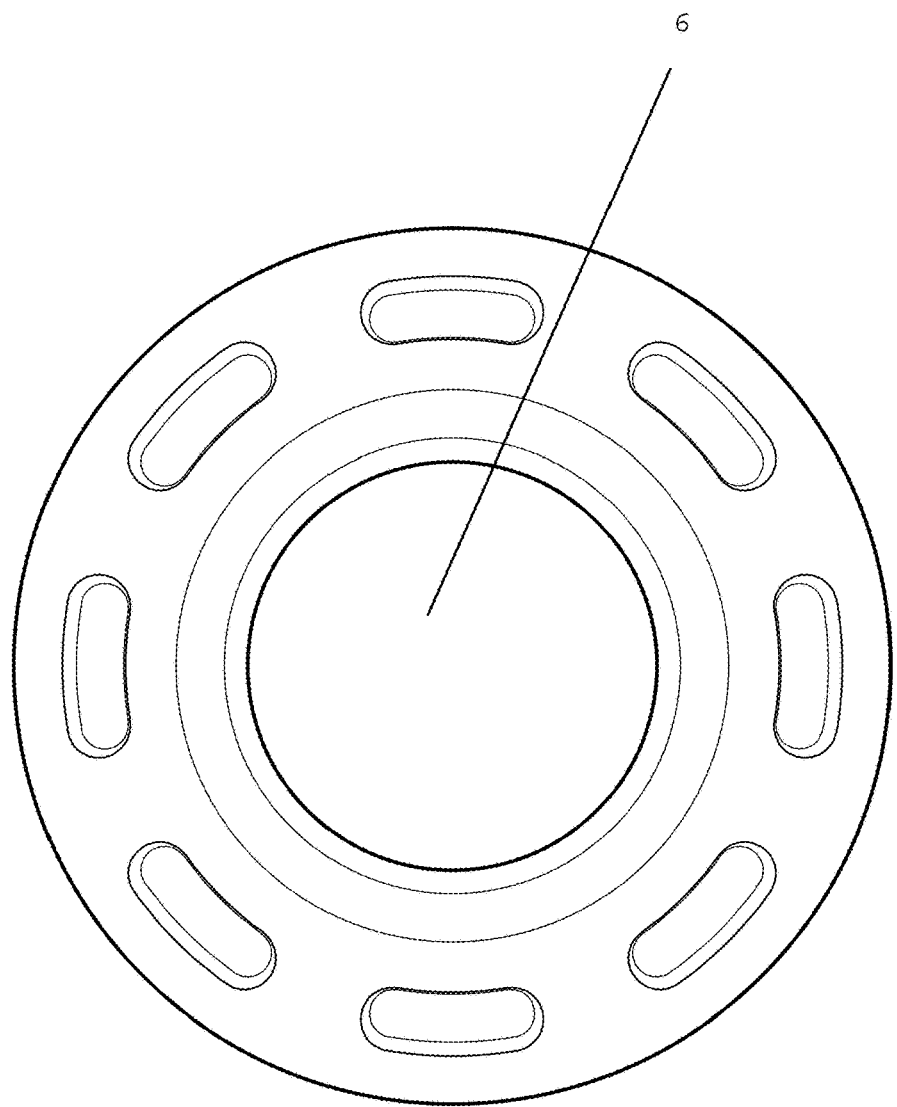
FIG. 10: is a top view of a rotational head in one embodiment thereof.
Figure 11:
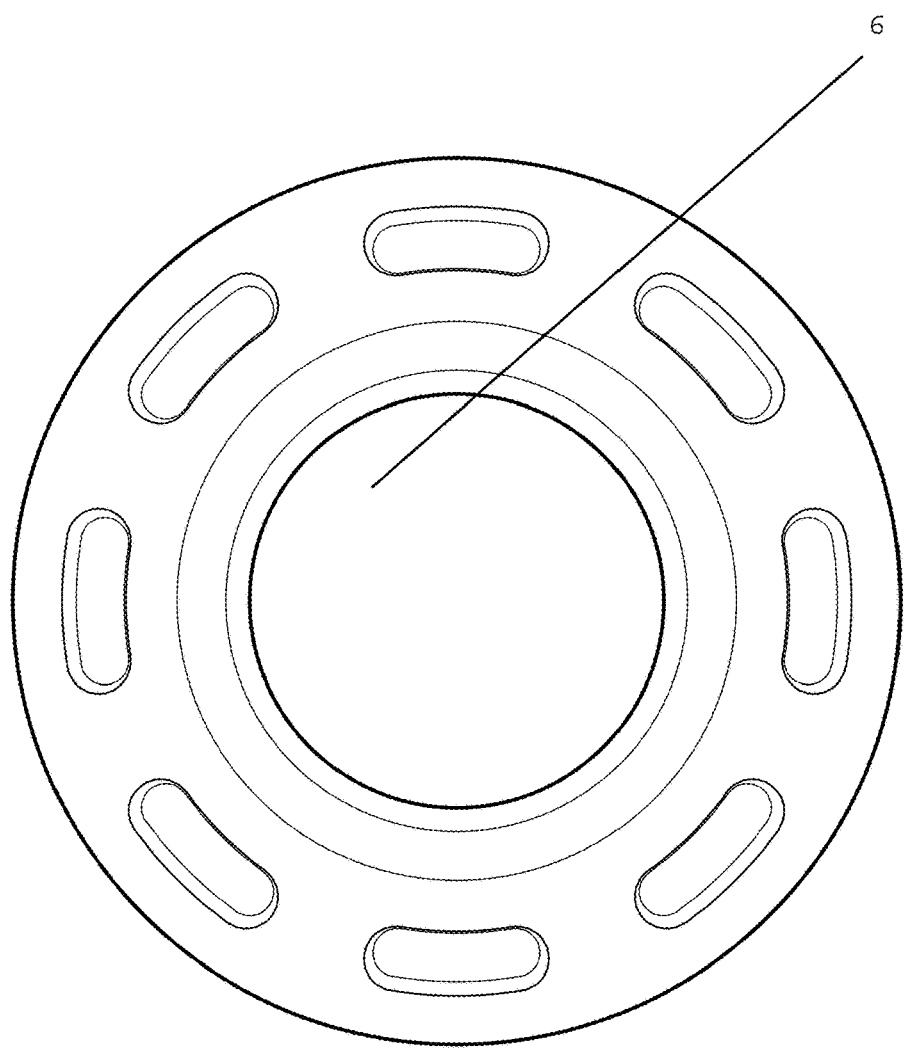
FIG. 11: is a bottom view of a rotational head in one embodiment thereof.
Figure 12:
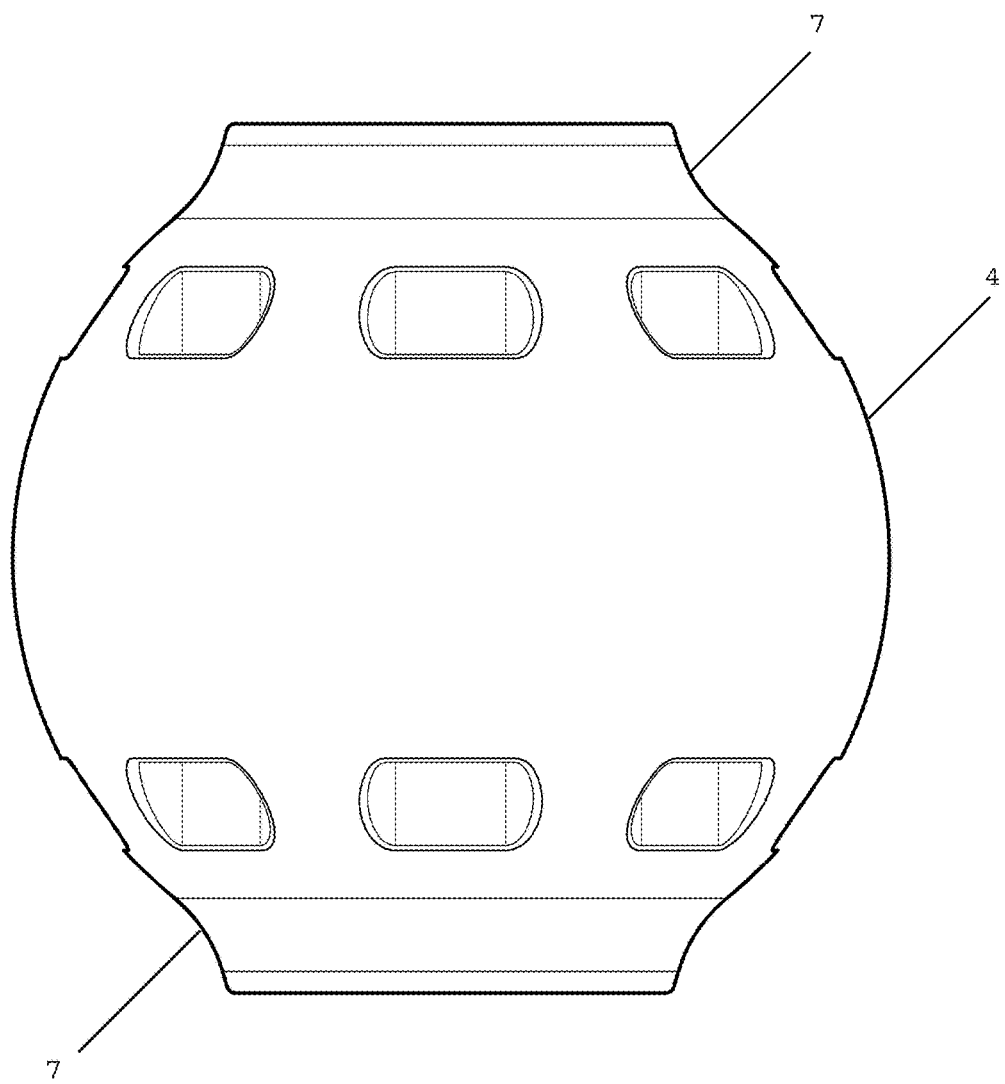
FIG. 12: is a side view of a rotational head in one embodiment thereof.
Figure 13:
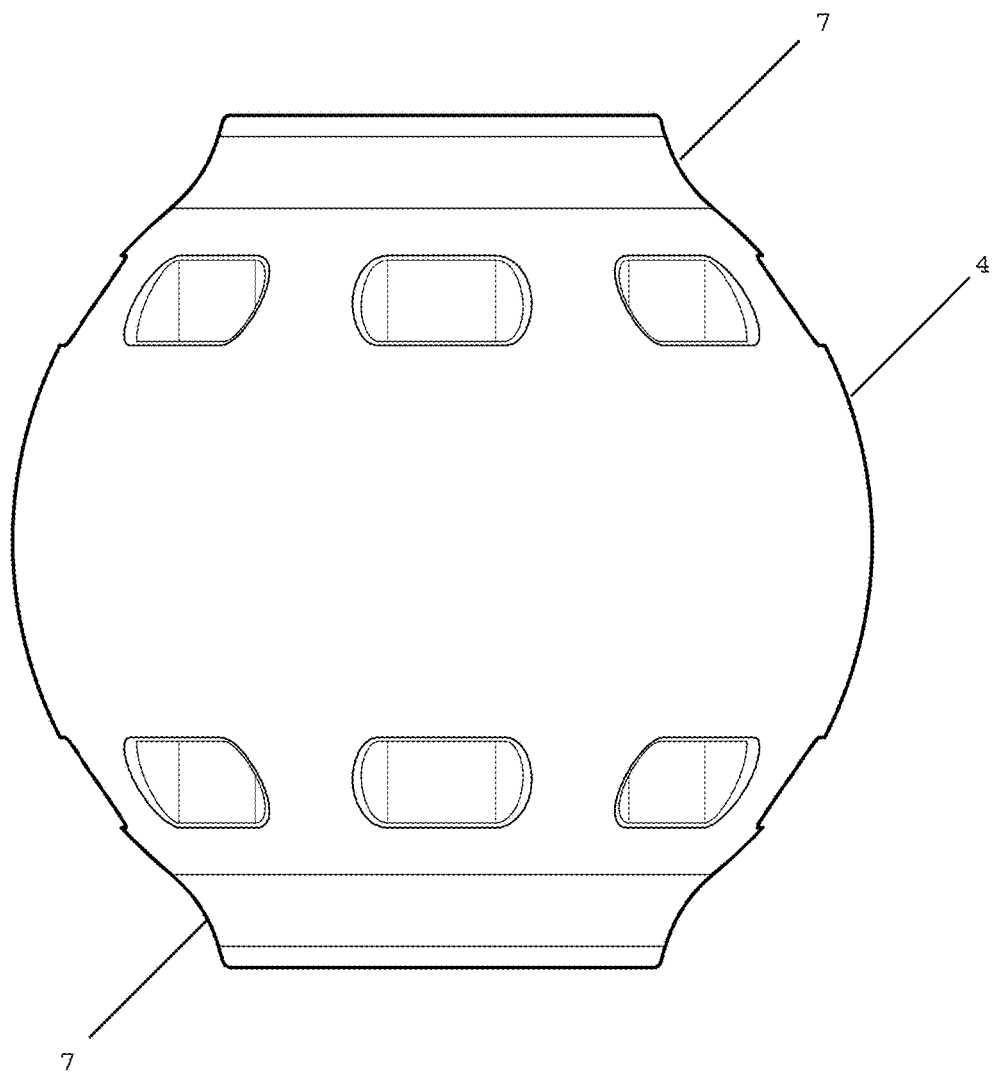
FIG. 13: is a side view of a rotational head in one embodiment thereof.
Figure 14:
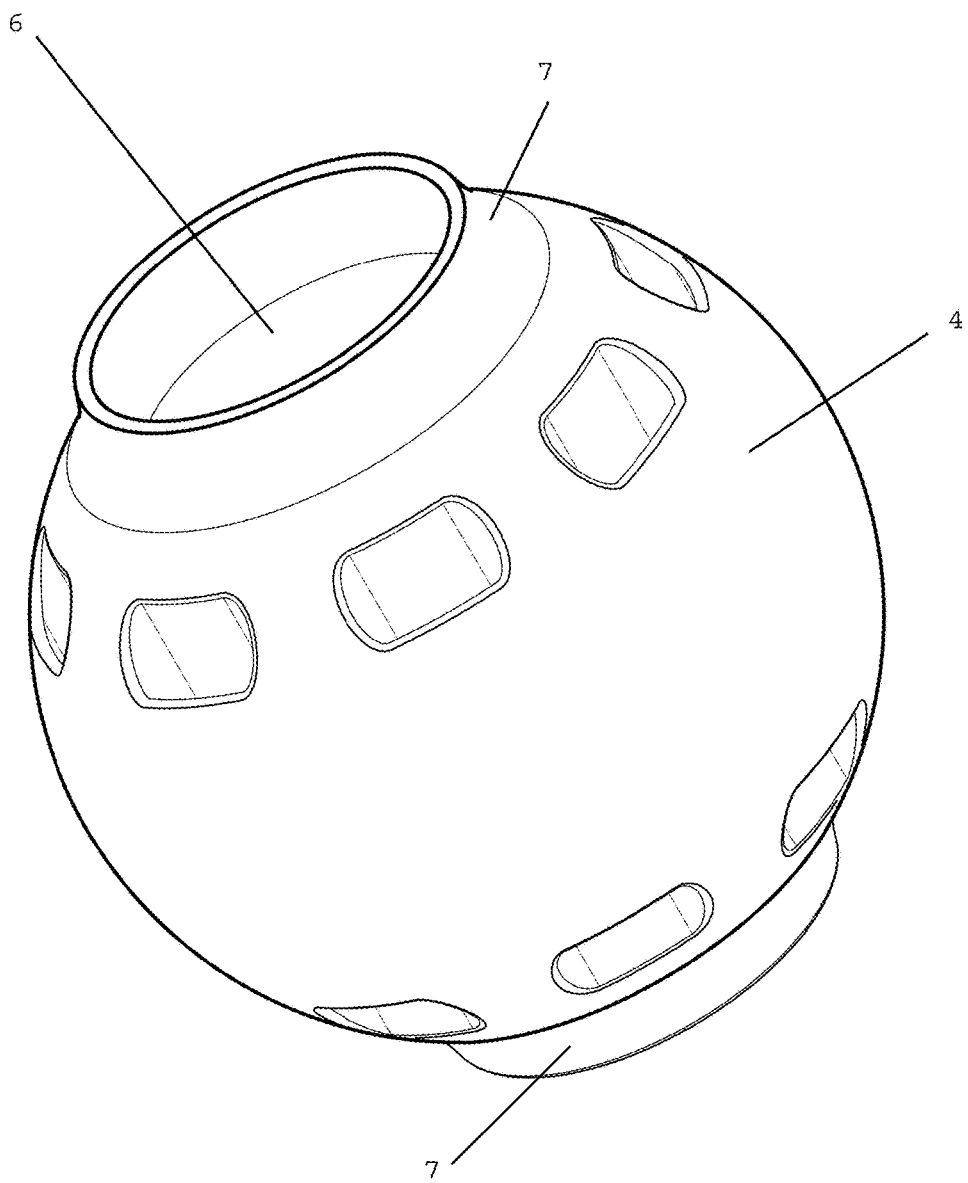
FIG. 14: is a perspective view of a rotational head in one embodiment thereof.
Figure 15:
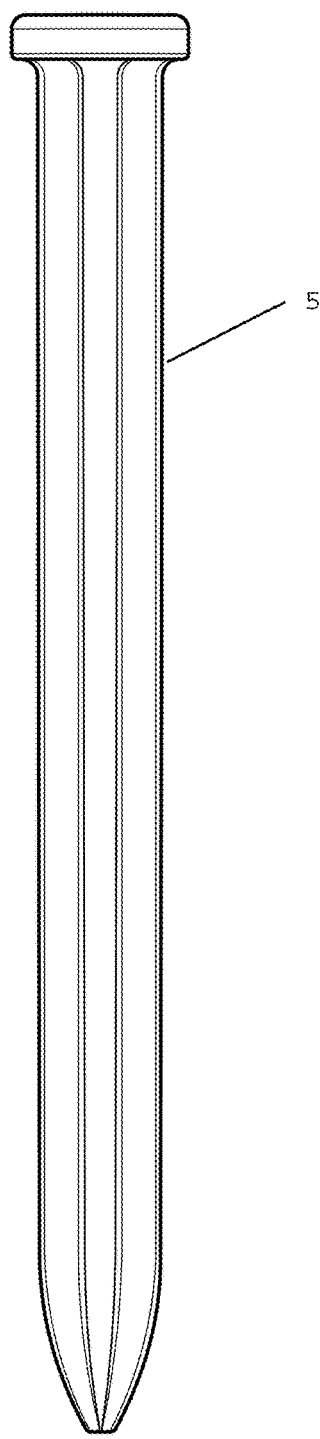
FIG. 15: is a front view of a surface fastener in one embodiment thereof.
Figure 16:
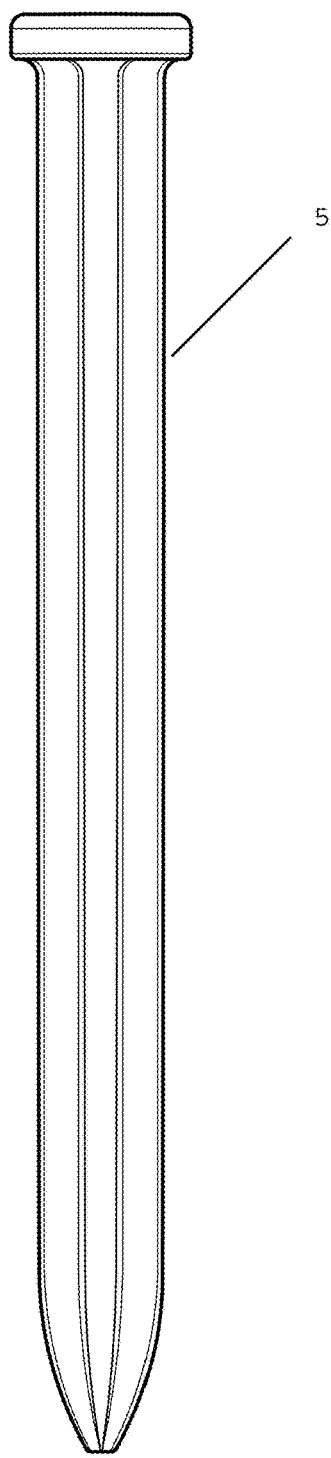
FIG. 16: is a back view of a surface fastener in one embodiment thereof.
Figure 17:
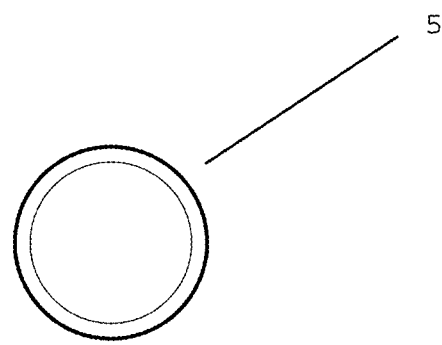
FIG. 17: is a top view of a surface fastener in one embodiment thereof.
Figure 18:
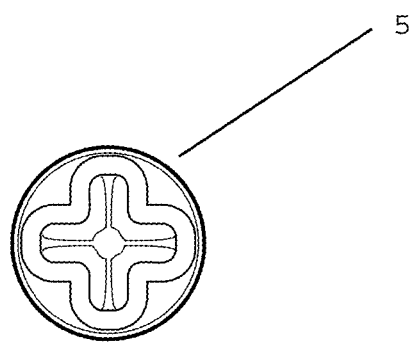
FIG. 18: is a bottom view of a surface fastener in one embodiment thereof.
Figure 19:
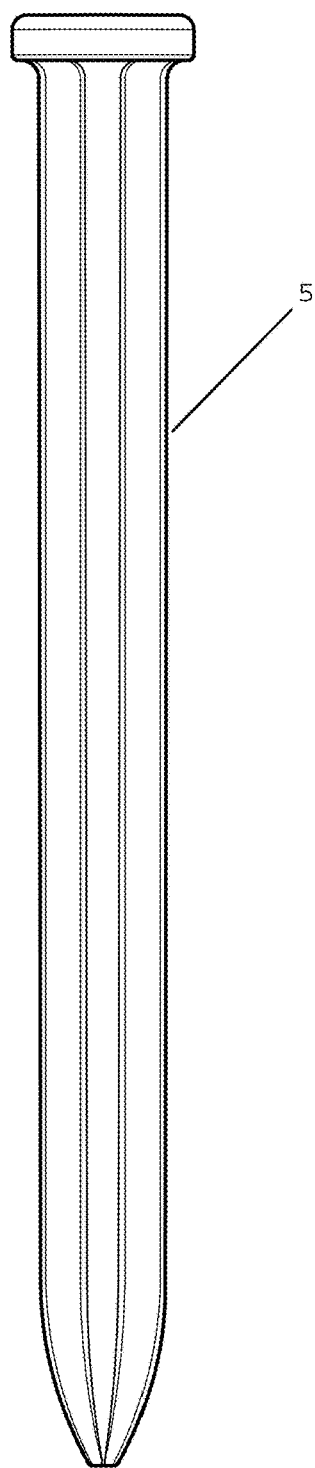
FIG. 19: is a side view of a surface fastener in one embodiment thereof.
Figure 20:
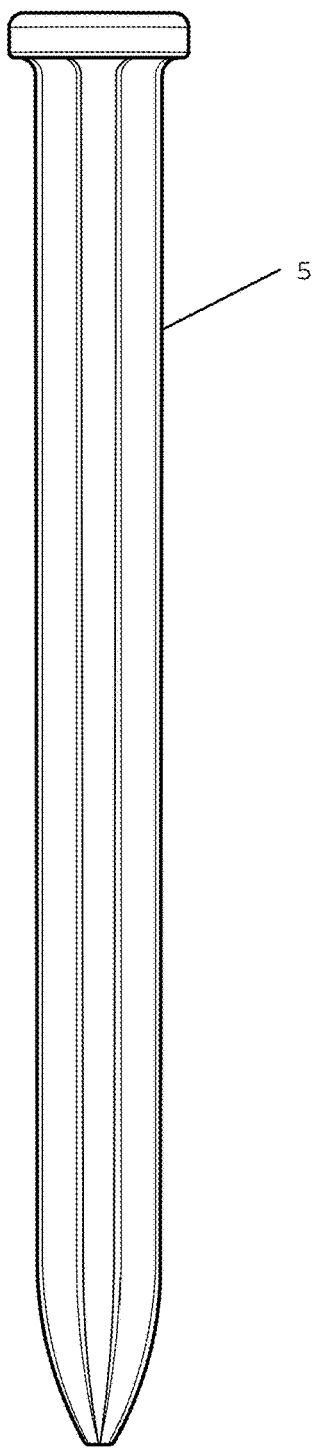
FIG. 20: is a side view of a surface fastener in one embodiment thereof.
Figure 21:
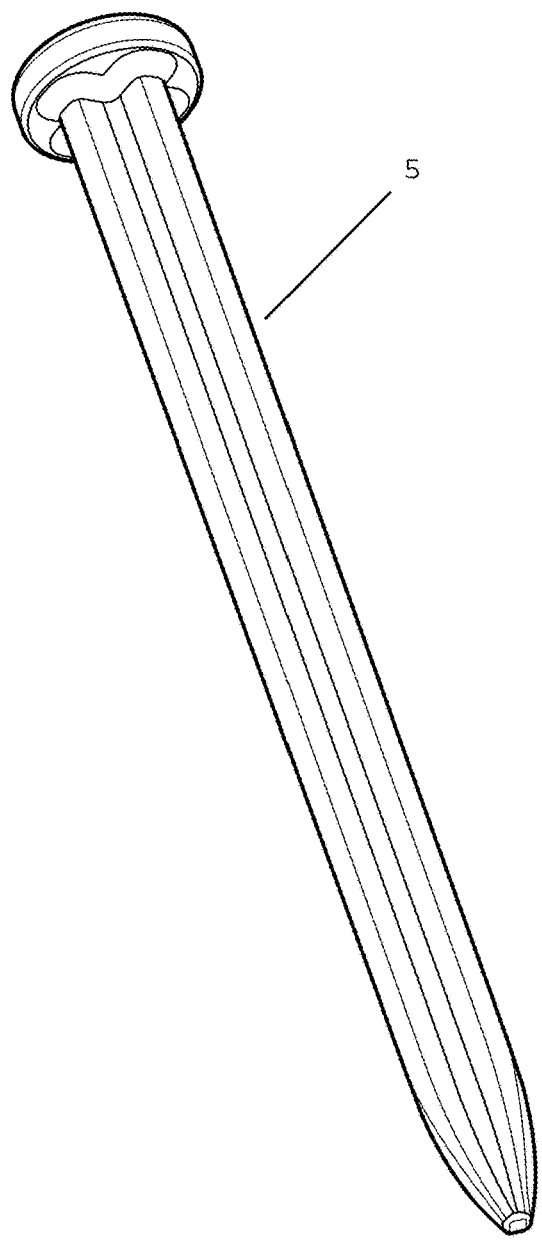
FIG. 21: is a perspective view of a surface fastener in one embodiment thereof.
Figure 22:
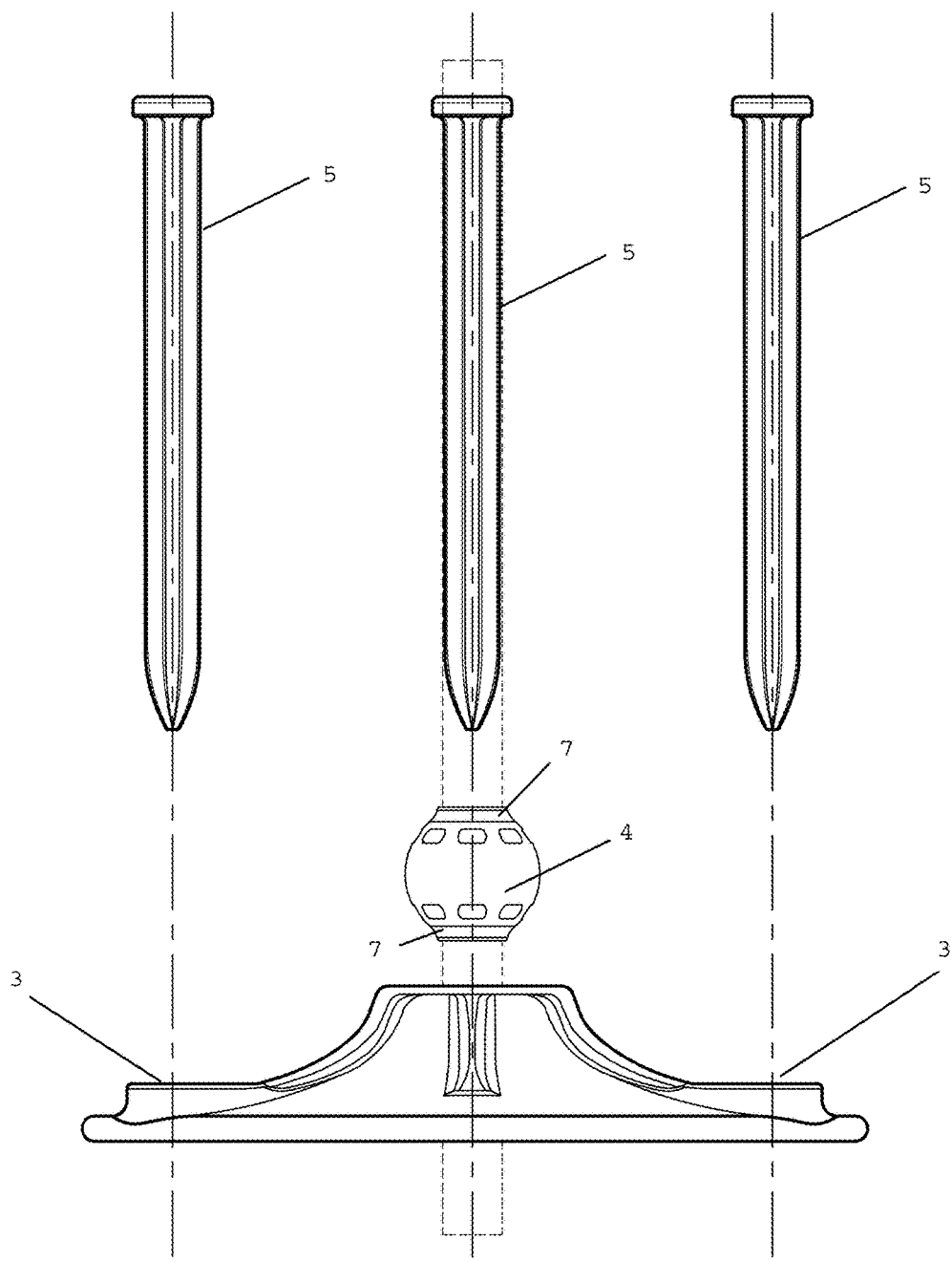
FIG. 22: is a front view of a support plate, a rotational head, a plurality of surface fasteners and a vertical pole in one embodiment thereof.
Figure 23:
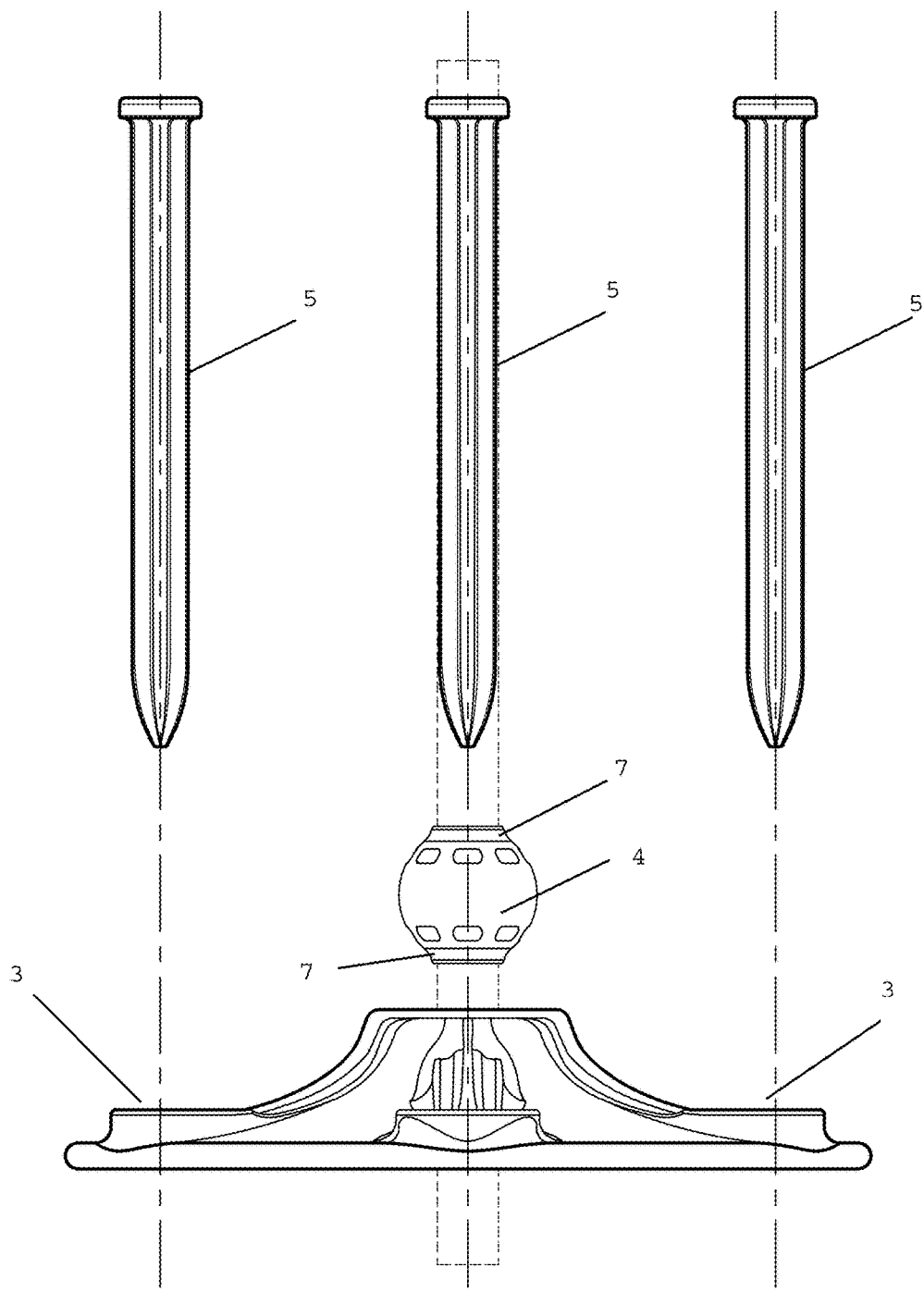
FIG. 23: is a back view of a support plate, a rotational head, a plurality of surface fasteners and a vertical pole in one embodiment thereof.
Figure 24:
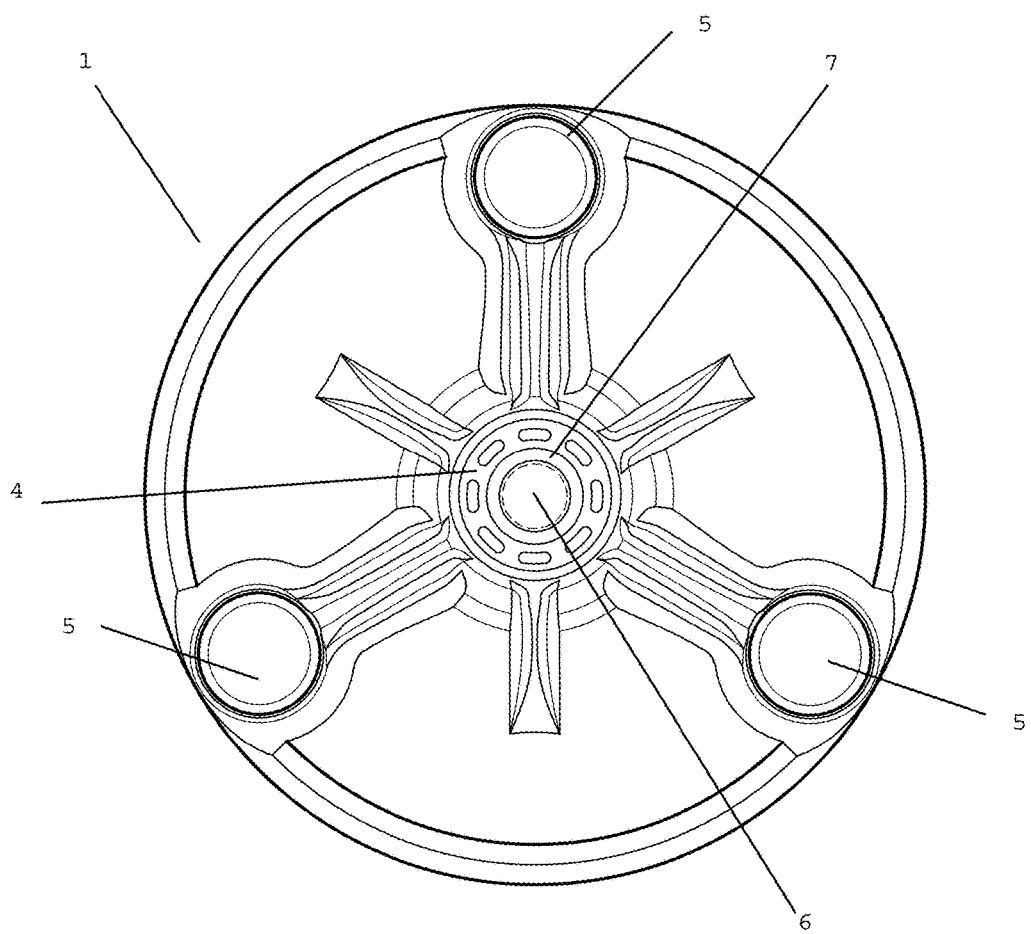
FIG. 24: is a top view of a support plate, a rotational head, a plurality of surface fasteners and a vertical pole in one embodiment thereof.
Figure 25:
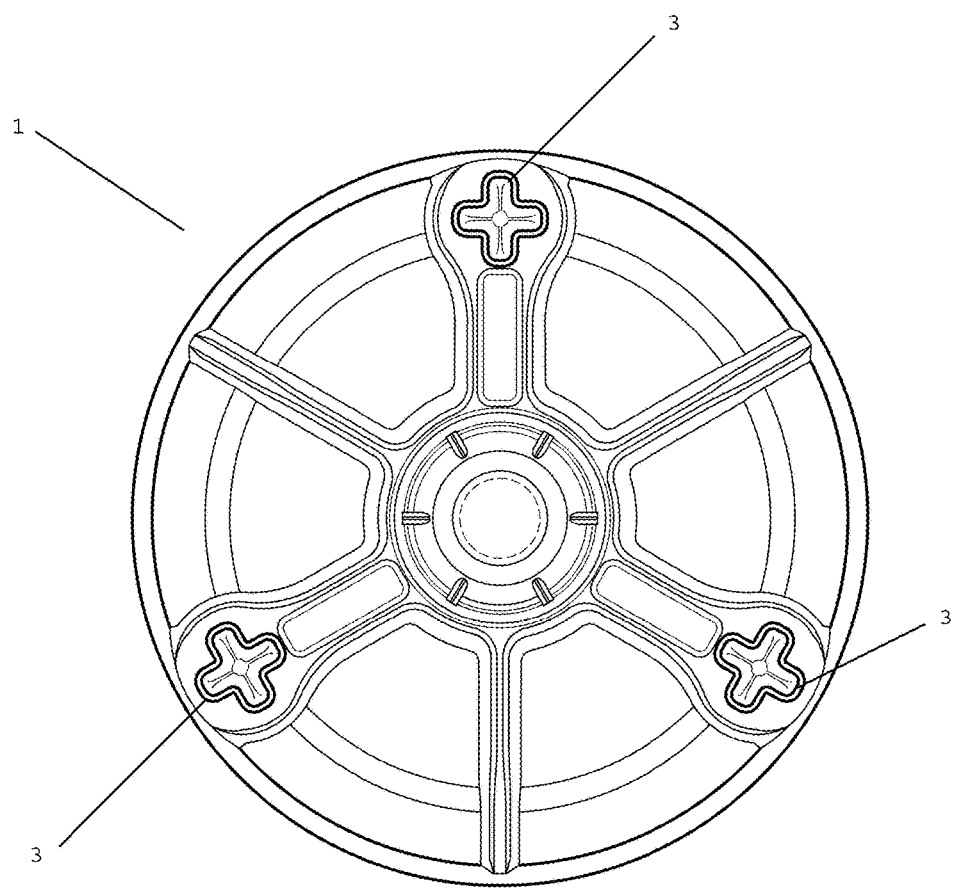
FIG. 25: is a bottom view of a support plate, a rotational head, a plurality of surface fasteners and a vertical pole in one embodiment thereof.
Figure 26:
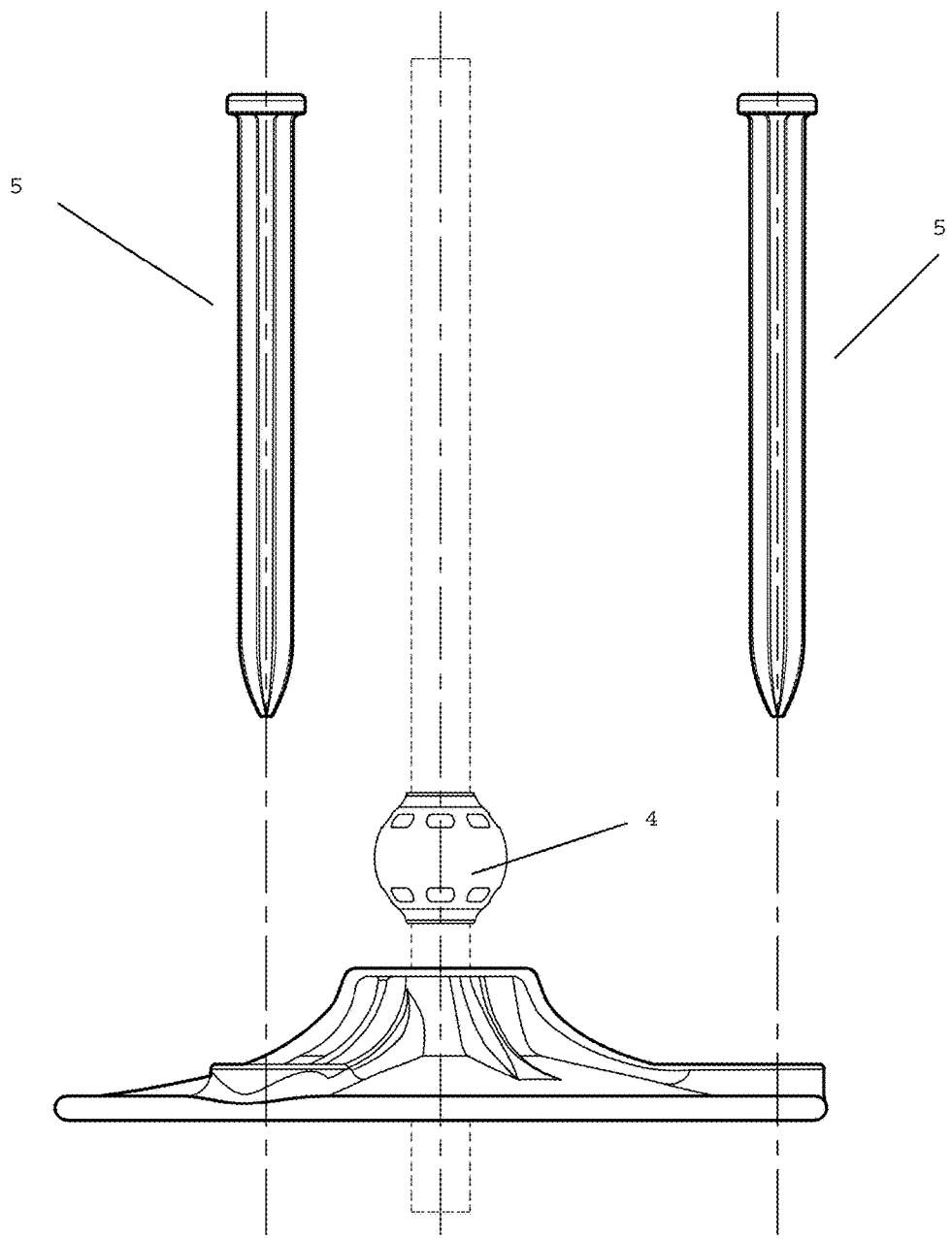
FIG. 26: is a side view of a support plate, a rotational head, a plurality of surface fasteners and a vertical pole in one embodiment thereof.
Figure 27:
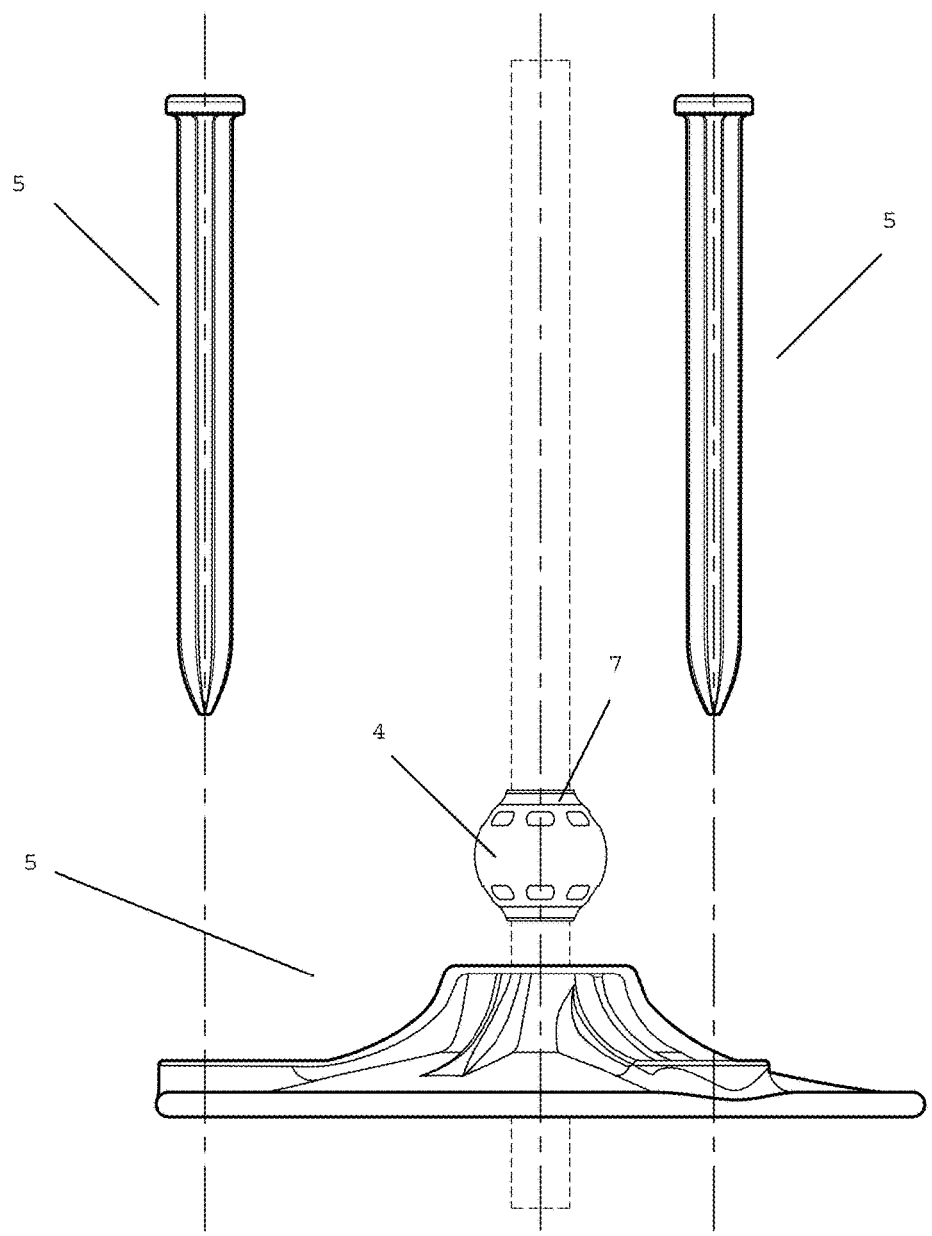
FIG. 27: is a side view of a support plate, a rotational head, a plurality of surface fasteners and a vertical pole in one embodiment thereof.
Figure 28:
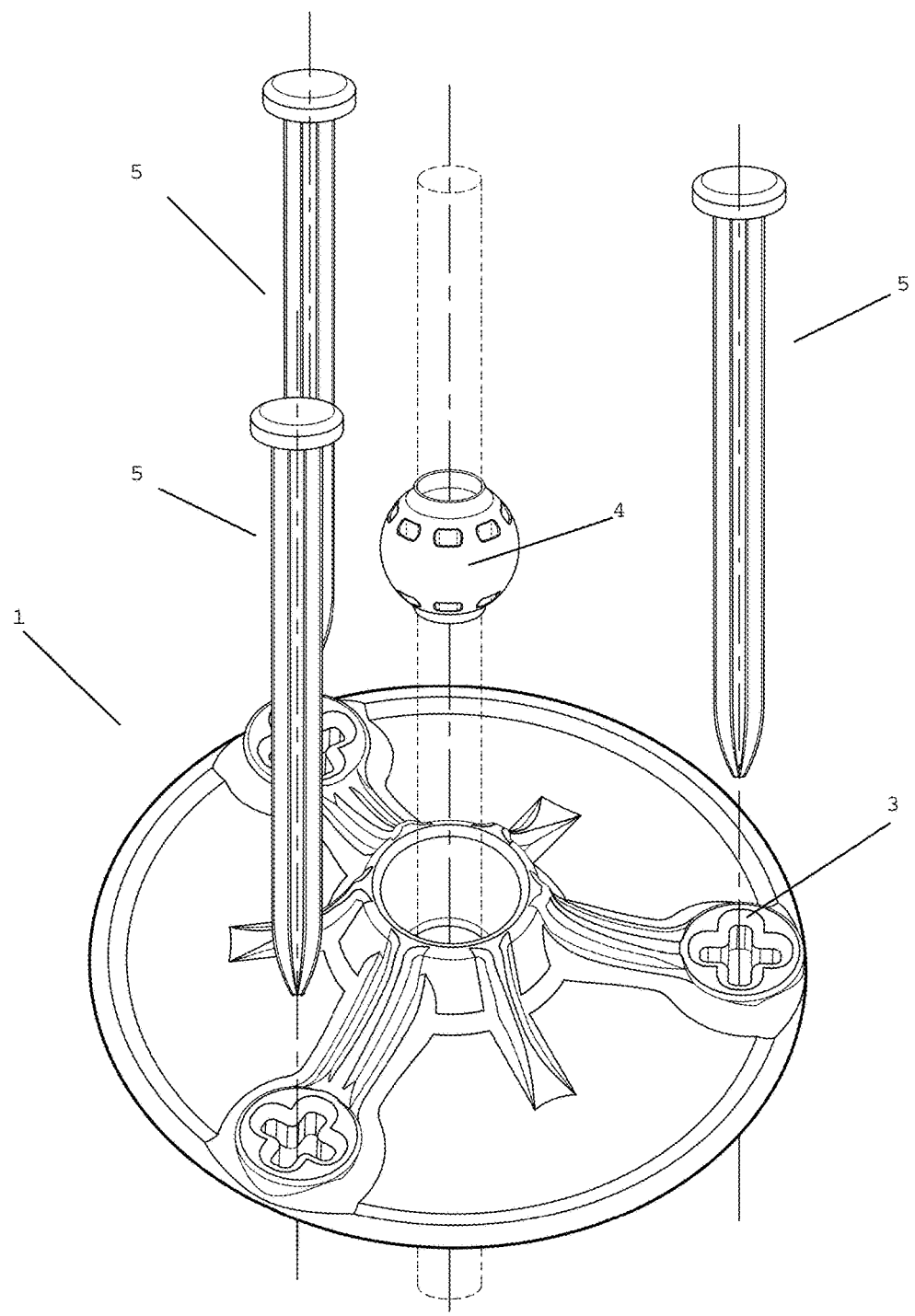
FIG. 28: is a perspective view of a support plate, a rotational head, a plurality of surface fasteners and a vertical pole in one embodiment thereof.
Figure 29:
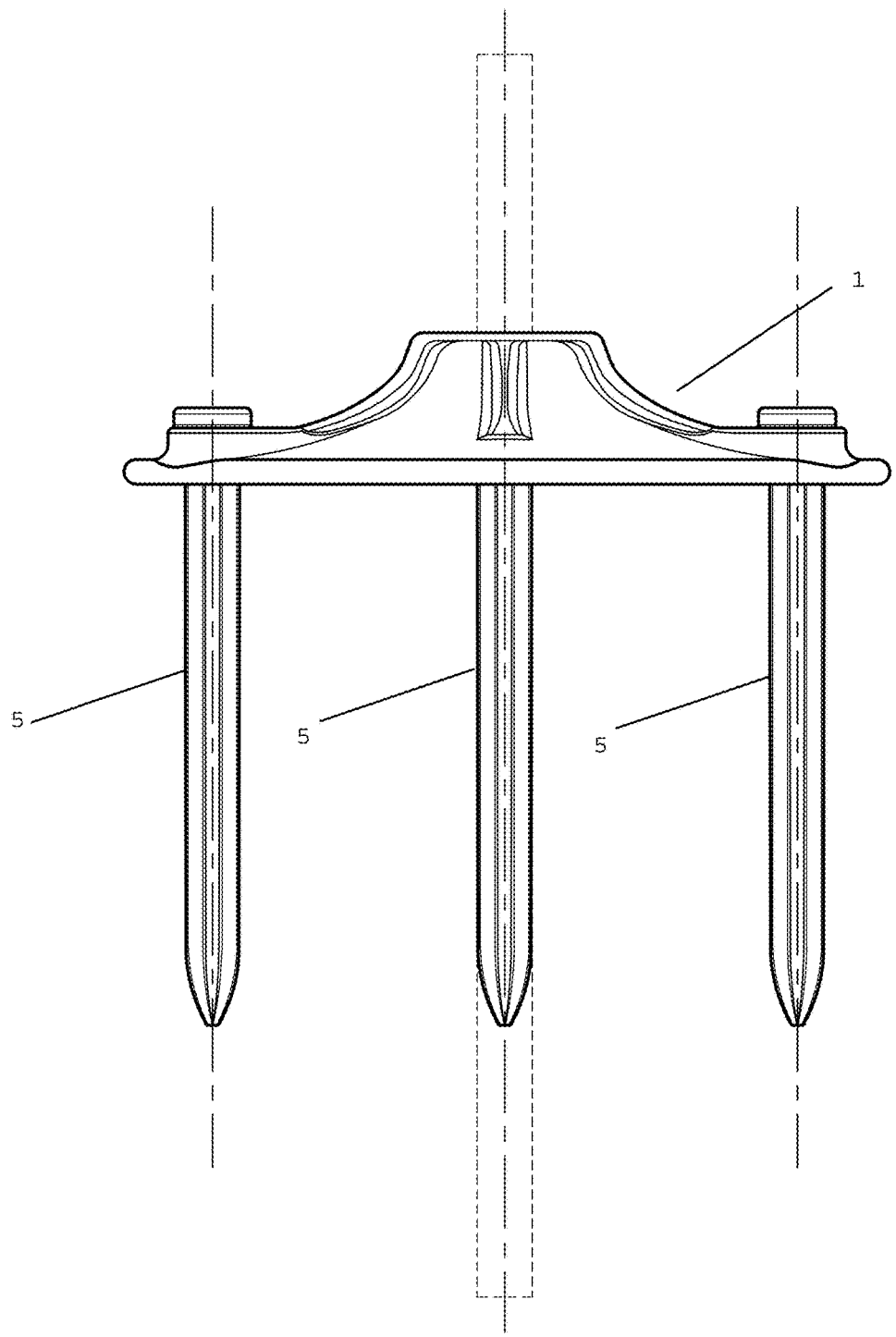
FIG. 29: is a front view of a support plate securing a rotational head, a plurality of surface fasteners and a vertical pole in one embodiment thereof.
Figure 30:
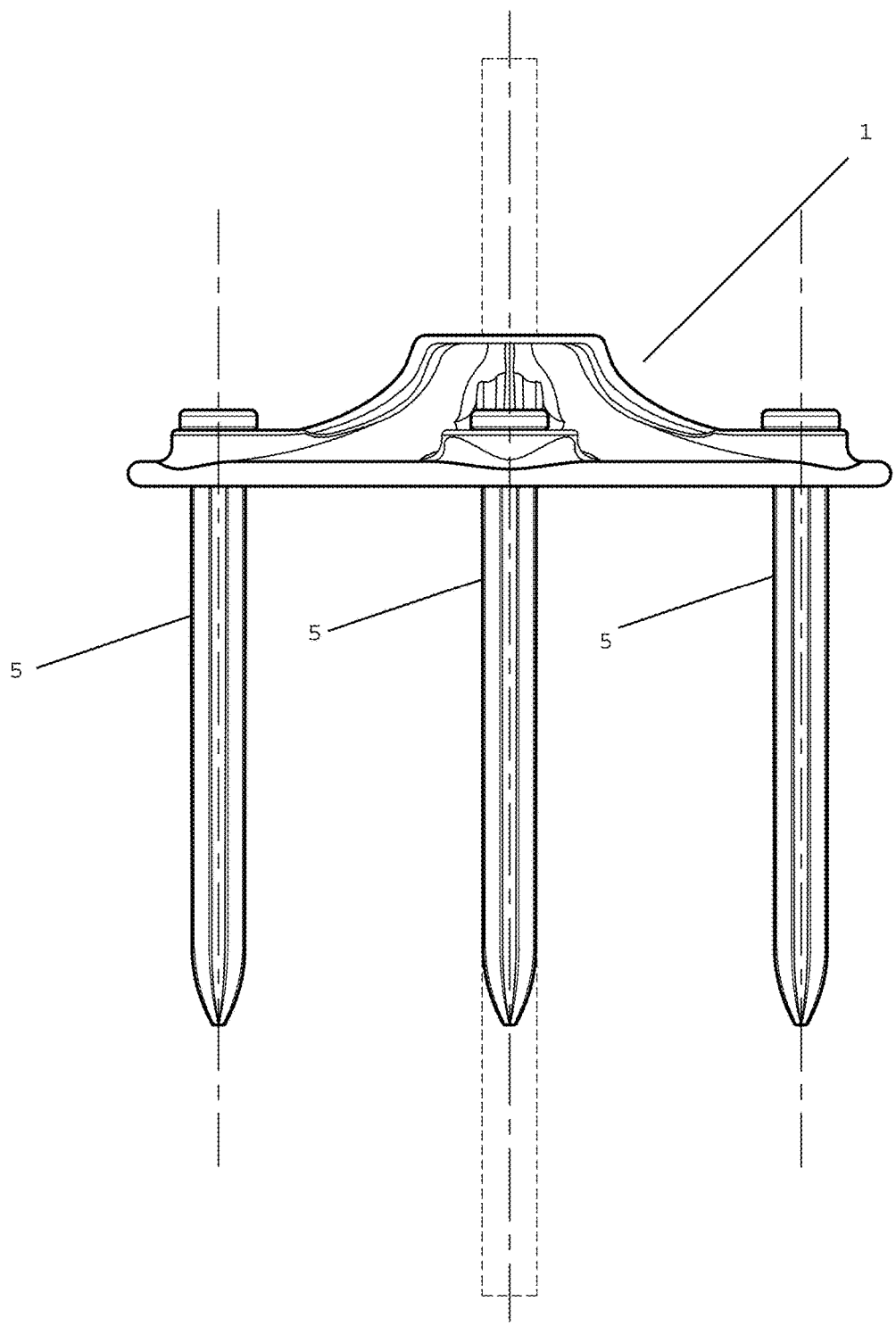
FIG. 30: is a back view of a support plate securing a rotational head, a plurality of surface fasteners and a vertical pole in one embodiment thereof.
Figure 31:
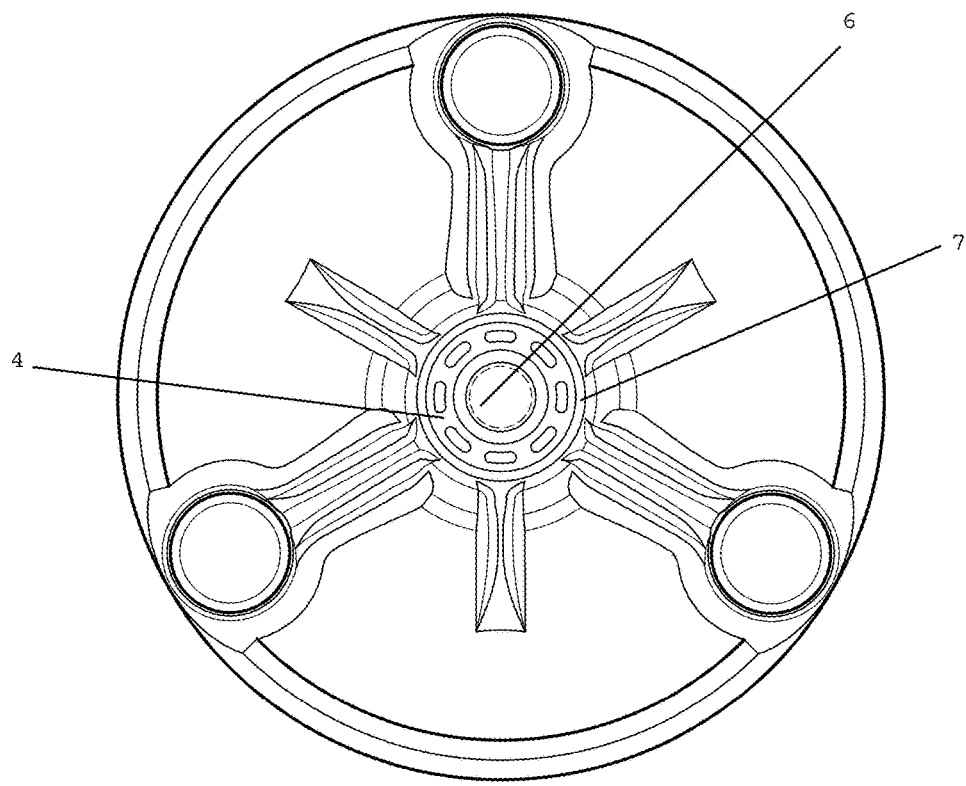
FIG. 31: is a top view of a support plate securing a rotational head, a plurality of surface fasteners and a vertical pole in one embodiment thereof.
Figure 32:
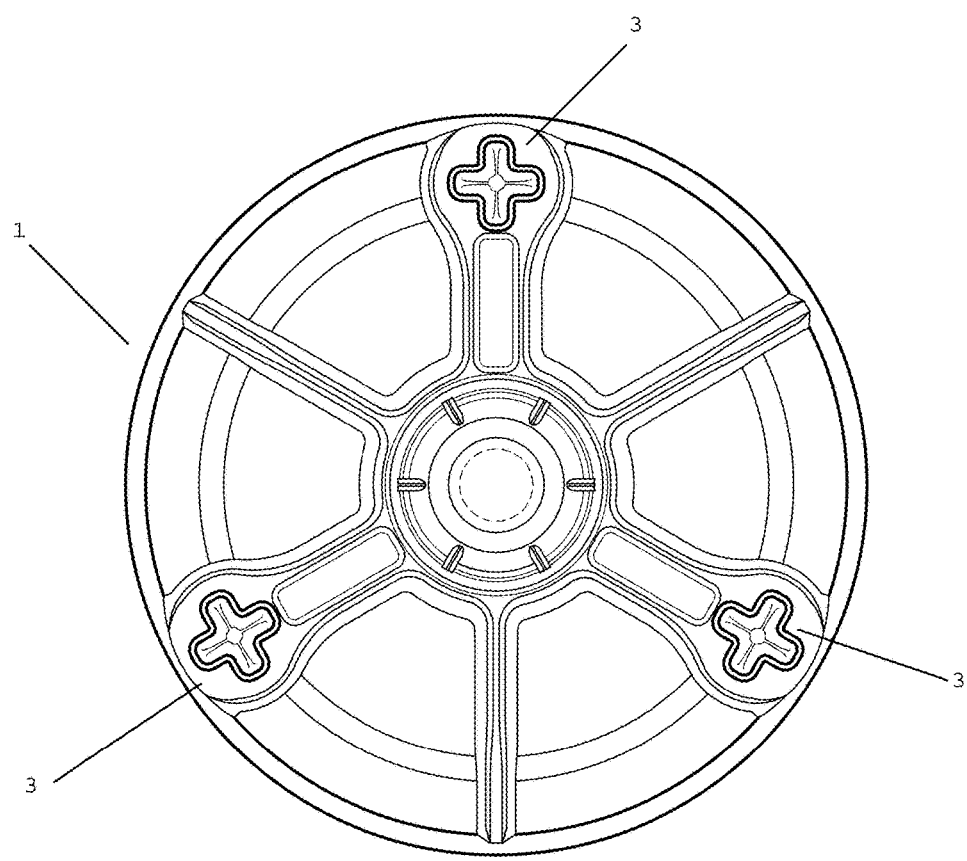
FIG. 32: is a bottom view of a support plate securing a rotational head, a plurality of surface fasteners and a vertical pole in one embodiment thereof.
Figure 33:
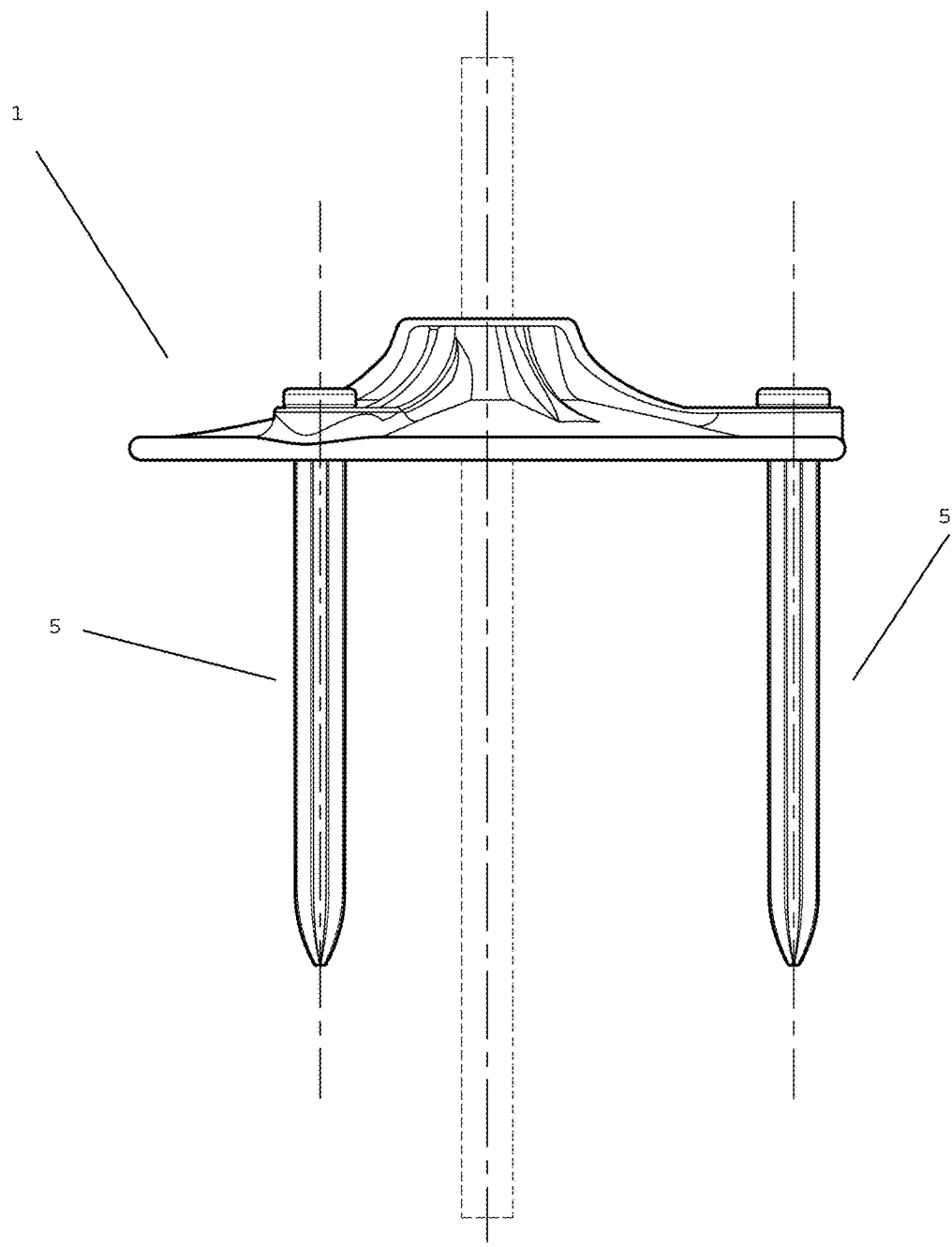
FIG. 33: is a side view of a support plate securing a rotational head, a plurality of surface fasteners and a vertical pole in one embodiment thereof.
Figure 34:
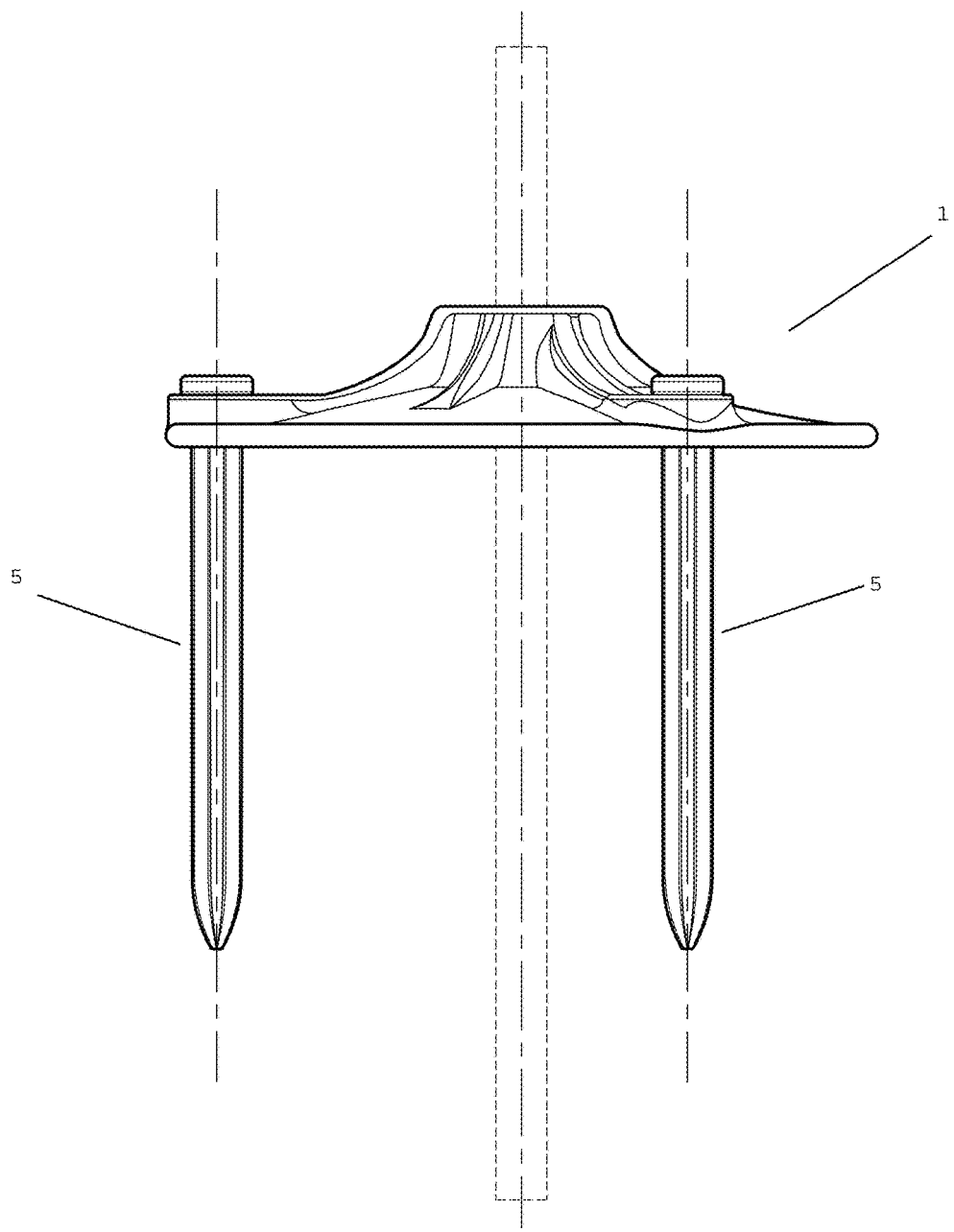
FIG. 34: is a side view of a support plate securing a rotational head, a plurality of surface fasteners and a vertical pole in one embodiment thereof.
Figure 35:
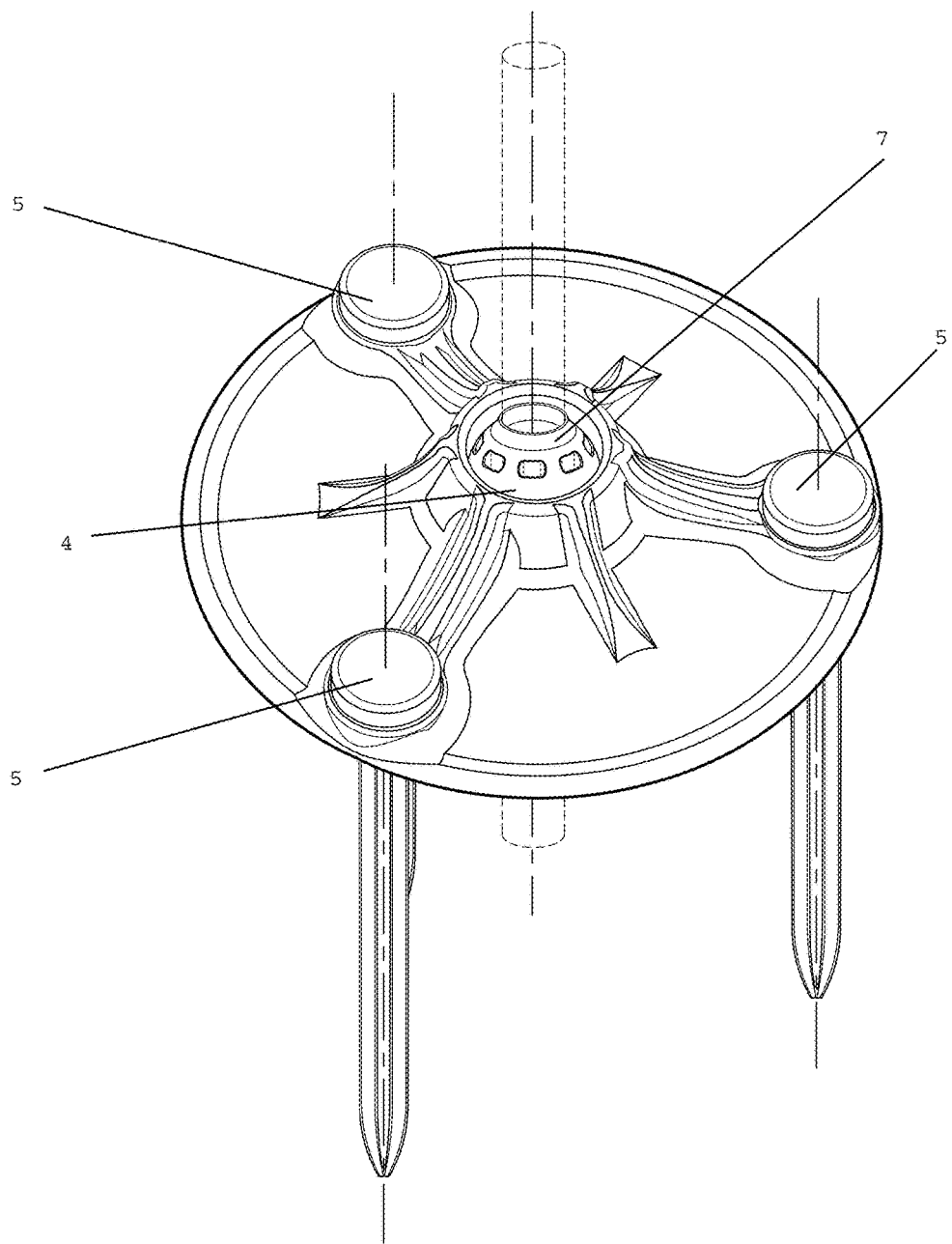
FIG. 35: is a perspective view of a support plate securing a rotational head, a plurality of surface fasteners and a vertical pole in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Generally referring to FIGS. 1-7, in one embodiment the inventive technology may include at least one support plate (1). In a preferred embodiment this support plate may be formed of a hard-plastic or other composite material. Again, as demonstrated in FIGS. 1-7 in this embodiment shown, the support plate may include a substantially flat bottom surface such that it may be placed over an attachment surface (not shown). In a preferred embodiment, this attachment surface may include a typical ground surface, such as a lawn or dirt surface or even a weighted stand configured to be coupled with a support plate and associated elements such as a vertical pole or balloon support. In additional embodiments, this attachment surface may include any position, regardless of the underlying attachment surface material where a user may wish to secure one or more support plates (1).

As generally shown in FIGS. 1-7, in one embodiment the support plate (1) may include one or more support plate apertures (2). As will be discussed in further detail, in a preferred embodiment, this aperture may allow a vertical pole (8) to pass through the support plate (1) and be inserted, in this embodiment into the ground. In certain other embodiments, this aperture may include one or more locking mechanisms such that a vertical pole (8) may be coupled with a support plate (1). Such locking mechanisms may include a snap lock, spring lock, a twist lock, or a fitted groove. Additional embodiments may include a support plate aperture (2) having one or more extensions that may act as mechanical blocks to corresponding grooves on a vertical pole so as to stop the pole's extension through the aperture, and ultimately into the ground. Naturally, such groove and extension may be switched so as to be configured on the support plate (1) and vertical pole (8) respectively.

Referring now to FIGS. 1-7 and 15-35, in one embodiment the support plate (1) may include one or more surface fastener slots (3). In one preferred embodiment, a surface fastener slot (3) may include a position configured to be coupled with one or more surface fasteners (5) so as to secure the support plate (1) to an attachment surface.

In the preferred embodiment generally shown in FIGS. 1-7 and 15-35, a plurality of surface fastener slots (3) may be positioned along the outer surface of a support plate (1). In this embodiment, such surface fastener slots (3) may be configured such that one or more surface fasteners (5) may be inserted through said slot positions and further inserted into an attachment surface, such as the ground, securing the support plate (1) to an attachment surface. In such a configuration, one or more support plates (1) may be secured to a variety of sloped or planar surfaces. In still further embodiments, a support plate (1) may include one or more integral surface fasteners (not shown). In this embodiment, a support plate (1) may be formed having one or more surface fasteners, such as a ground spike, that form part of, and are integral with the support plate (1). In this embodiment, a support plate (1) may be secured to an attachment surface through insertion of the integral surface fasteners. In a still further embodiment, a support plate (1) may be coupled with an attachment surface through a variety of methods, including adhesive, quick release lock mechanisms, suction, or even magnet attachments.

In still other embodiments, certain elements may initially be manufactured as individual elements and coupled together. However, in some embodiments such components, for example a support plate (1) and one or more surface fasteners (5) may be individually manufactured, for example out of plastic or fiberglass and then overmolded together to form a unitary component. Such overmold coupling may apply to any and all components and configurations explicitly and implicitly described herein.

In an additional embodiment, a rotational head (4) may be secured within the rotational head chamber (9), and may further be supported by a rotational joint (not shown). In a preferred embodiment, the rotational head (4) may be secured within the rotational head chamber (9) and supported by one or more extensions that may in some instances allow forward and backward rotation while restricting rotational movement. In yet other embodiments, rotational head chamber (9) may secure a rotational head (4) through a fitted channel that may allow rotational as well as a limited range of back and forth movement. In additional embodiments, a rotational head (4) may be secured within a support plate aperture (2) and not within a rotational head chamber (9). In this embodiment, a rotational head (4) may be secured and supported within support plate aperture (2), such as by a rotatable or other support joint so as to allow securement of a vertical pole (8) with full and/or limited rotational and/or back and forth movement.

Referring now to FIGS. 7-14, and 22-35, in one preferred embodiment, a rotational head (4) may be positioned within a rotational head chamber (9) on a support plate (1). In certain embodiments, the rotational head (4) may be secured within the rotational head chamber (9), perhaps by a narrowing of the support plate aperture (2), and/or one or more extension supports. In this embodiment, this rotational head (4) may include one or more vertical pole apertures (6), such that a vertical pole (8) may be inserted through and coupled with the rotational head (4). In certain embodiments, this coupling may include a tight tolerance between the vertical pole (8) and vertical pole aperture (6) such that the rotational head (4) may form a friction coupling with said rotational head (4) which, in this embodiment may act as a support and/or mechanical support to prevent the vertical pole (8) from being inserted into an attachment surface beyond a certain point.

In one preferred embodiment, a vertical pole (8) may be inserted through and coupled with the rotational head (4) which is then inserted into a rotational head chamber (9) on a support plate (1). In this preferred embodiment, the placement of the rotational head (4) which is then inserted into a rotational head chamber (9) may concurrently cause the vertical pole (8), again coupled with the rotational head (4) to be inserted into the attachment surface. Naturally such sequence is non-limiting, as a support plate may first be secured to an attachment surface, while in other embodiments, the vertical pole may be secured to an attachment surface and the like.

Again referring to FIGS. 7-14, and 22-35, the rotational head (4) may rotate within the rotational head chamber (9). In this preferred embodiment, a support plate (1) may be secured to a sloped, or uneven attachment surface, such as the side of a hill or other incline, while the vertical pole (8) coupled with a rotational head (4) may be positioned with rotational head chamber (9) such that it is able to rotate itself and its corresponding couple vertical pole (8) to an approximately vertical position. This self-adjusting feature allows a support plate (1) to be secured to an angled attachment surface, while allowing the vertical pole to be rotationally self-adjusted to an approximate vertical position. In certain other embodiments, a rotational head (4) may also include one or more support plate interface surfaces (7). In this embodiment, one or more support plate interface surfaces (7) may be positioned along the upper, and/or lower edge of the vertical pole aperture (6) of the rotational head (4), such that the surface prevents the rotational head (4) from freely rotating within the rotational head chamber (9).

In this configuration, a display, such as a balloon support (10) may be positioned on an angled slope while remaining approximately vertical. Such self-adjustment not only allows a more aesthetically pleasing display, but prevents the display from tipping over due to environment factors such as wind, or as a result of its own weight. Additionally, such configuration provides additional support for the vertical pole display, such as a balloon support (10) so that it does not become inserted further into the ground, while also preventing it from detaching from an attachment surface. This novel configuration may also restrict multi-directional movement which may loosen the vertical pole's coupling with an attachment surface, or enlarged, for example a hole in a ground surface damaging the surface and/or causing the vertical pole, display or balloon support (10) to collapse. This self-adjusting configuration may also prevent wear on the support plate (1) as a result of the movement of a coupled vertical pole (8), display or balloon support (10).

Figure 36:
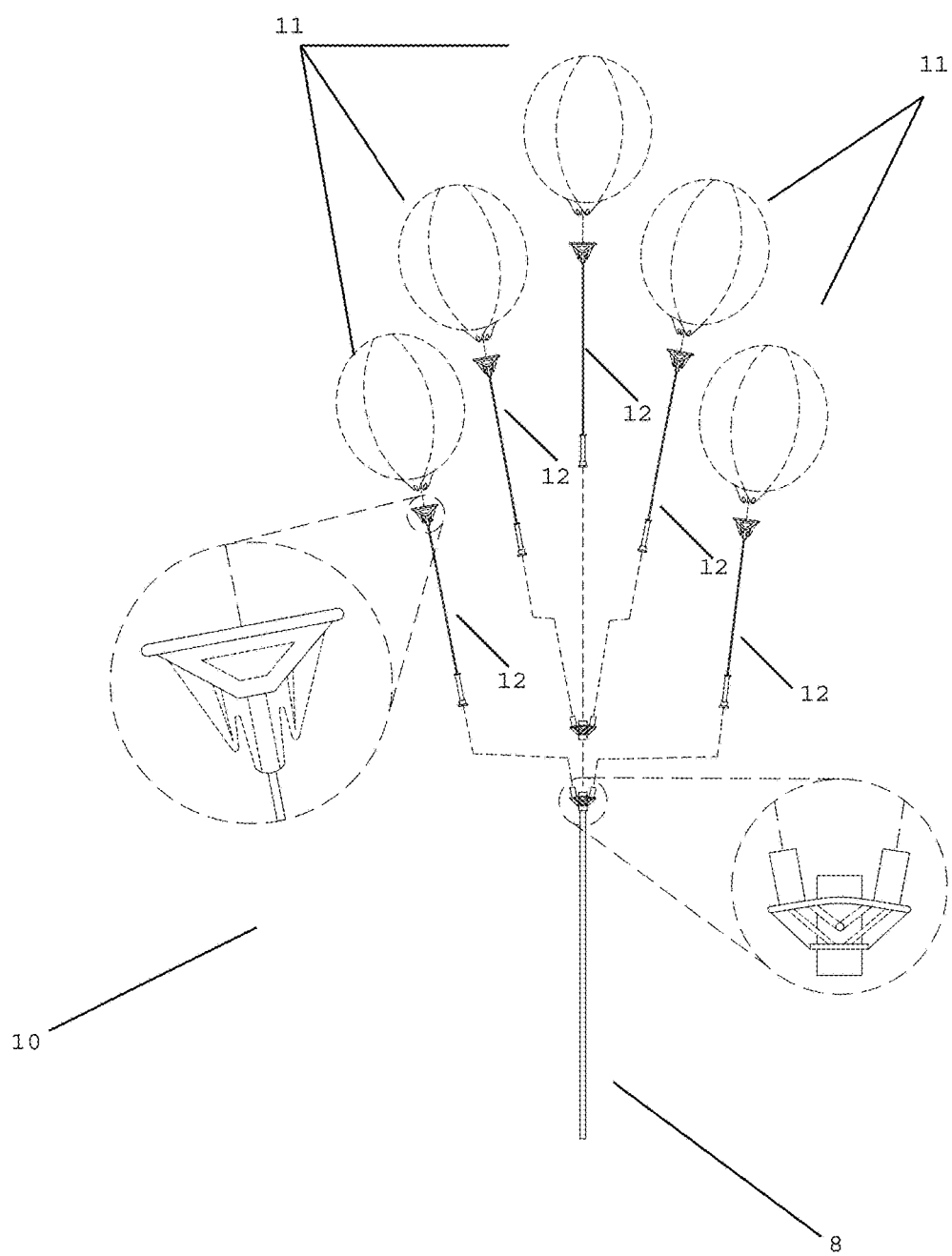
FIG. 36: is a balloon support in one embodiment thereof.
Figure 37:
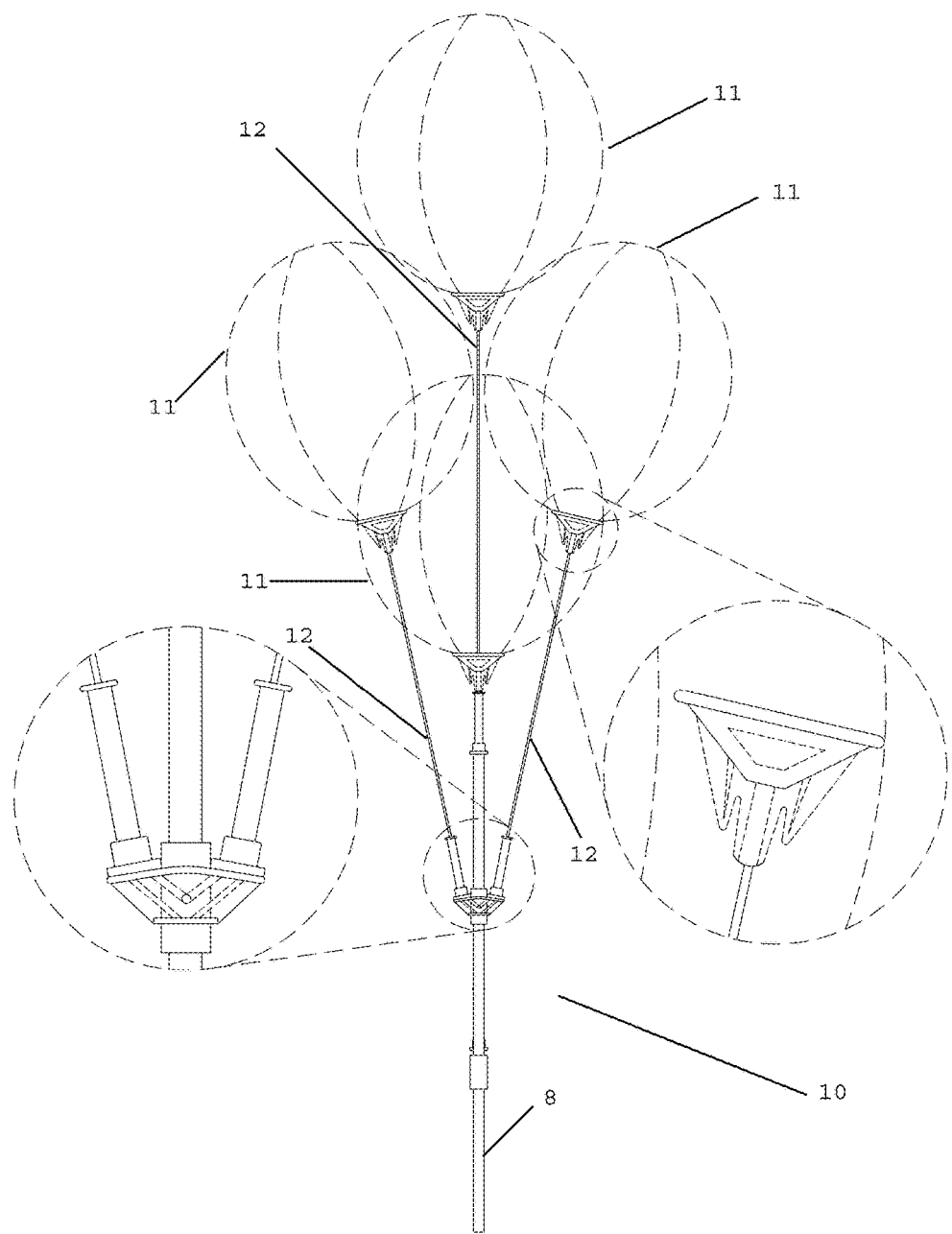
FIG. 37: is a balloon support in one embodiment thereof.
Figure 38:
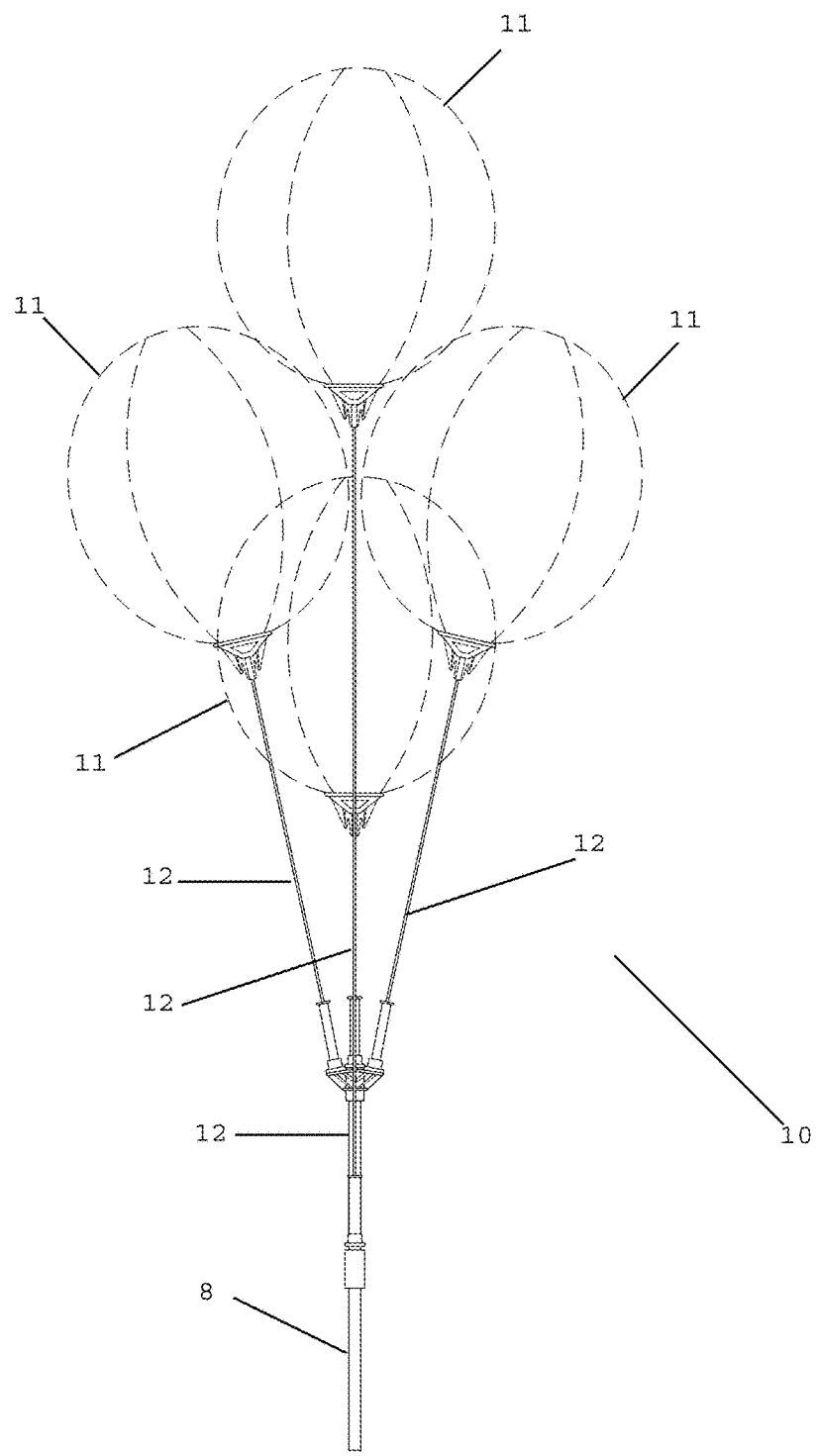
FIG. 38: is a balloon support in one embodiment thereof.

In one embodiment, one or more marketing displays, such as signs, posters and the like may be secured to an attachment surface utilizing the inventive technology herein. In a preferred embodiment such marketing displays may be secured to an angled surface while being able to maintain an approximately vertical orientation. Referring generally to FIGS. 36-38, in a preferred embodiment, one or more balloon supports (10) may be secured to an attachment surface utilizing the inventive technology herein. Generally, a balloon support (10) may include any support mechanism that may be coupled with and display one or more balloons. In a preferred embodiment, such balloons may include helium-free balloons (11) and balloon supports (10) (such as those described in U.S. application Ser. Nos. 14/201,665, 62/013,973, 14/635,898, 29/444,898, U.S. Pat. No. 8,968, 047 as well as examples found at www.balloonin.com/, such exemplary helium-free balloons and balloon support and displays all being incorporated herein specifically by reference) that may be presented singly, or in a group and may, in certain embodiments be supported on flexible and/or static rods (12). Indeed, FIGS. 36-38 are merely exemplary in nature as a variety of balloon supports (10) may be contemplated. For example, in some embodiments a balloon support (10) may be coupled with a vertical pole which may be secured to an attachment surface by the inventive technology described herein, while in other embodiments a balloon support may be directly secured to an attachment surface by the inventive technology without a vertical pole.

In another embodiment, the support plate aperture (2) may be configured to secure, for example a vertical pole (8), at a specified angle. In this non self-adjusting embodiment, one or more support plate apertures (2) may be configured to secure one or more vertical poles, perhaps through a simple fitted coupling, as well as any of the other coupling mechanisms or mechanical stops/blocks previously described. In this embodiment, vertical pole (8) or balloon support (10) may be secured in either a planar or angled surface and be placed in a desired orientation.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a self-adjusting support plate system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a self-adjusting support plate system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention, such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. A self-adjusting support plate coupled with at least one helium-free balloon display comprising:
   a support plate having at least one surface fastener slot and at least one support plate aperture;
   at least one surface fastener configured to be coupled with said surface fastener slot so as to secure said support plate to an attachment surface;
   at least one rotational head having a vertical pole aperture positioned within a rotational head chamber on said support plate;

at least one vertical pole coupled with said rotational head so as to be rotationally adjustable and further inserted into the attachment surface; and at least one helium-free balloon display coupled with said vertical pole.

2. A self-adjusting support plate coupled with at least one helium-free balloon display as described in claim 1 wherein said rotational head comprises a rotational head having at least one support plate interface surface.

3. A self-adjusting support plate coupled with at least one helium-free balloon display as described in claim 1 wherein said at least one helium-free balloon display having a plurality of helium-free balloons coupled with at least one balloon support through at least one rod which is further coupled with said vertical pole.

4. A self-adjusting support plate coupled with at least one helium-free balloon display as described in claim 1 wherein said at least one helium-free balloon display having a plurality of removably engaged helium-free balloons coupled with at least one balloon support through at least one rod.

5. A self-adjusting support plate coupled with at least one helium-free balloon display as described in claim 1 wherein said vertical pole comprises a vertical pole coupled with the helium-free balloon display.

6. A display support plate comprising:

a support plate;

at least one rotational head having a vertical pole aperture positioned within a rotational head chamber on said support plate;

at least one vertical pole coupled with said rotational head through said vertical pole aperture so as to be rotationally adjustable within said rotational head chamber and where said rotational head is configured to be adaptable such that it may be adjustably positioned along the length of said vertical pole; and at least one display coupled with said vertical pole coupled with said rotational head so as to be rotationally adjustable and wherein said vertical pole is further inserted into an attachment surface and wherein said display comprises at least one helium-free balloon display.

7. A display support plate as described in claim 6 wherein said rotational head comprises a support plate interface surface.

8. A display support plate as described in claim 6 wherein said at least one helium-free balloon display having a plurality of helium-free balloons coupled with at least one balloon support through at least one rod which is further coupled with the vertical pole.

9. A display support plate as described in claim 6 wherein said at least one helium-free balloon display having a plurality of removably engaged helium-free balloons coupled with at least one balloon support through at least one rod.

10. A display support plate as described in claim 6 wherein said vertical pole comprises a vertical pole coupled with the helium-free balloon display.

11. A display support plate as described in claim 6 and further comprising at least one surface fastener slot configured to be coupled with at least one surface fastener.

12. A display support plate as described in claim 6 and further comprising at least one integral surface fastener.

* * * * *